United States Patent
Mosca et al.

(10) Patent No.: US 12,307,176 B2
(45) Date of Patent: May 20, 2025

(54) SYSTEM AND METHOD FOR REDUCING CNOT COUNT IN CLIFFORD+T CIRCUITS ON CONNECTIVITY CONSTRAINED ARCHITECTURES

(71) Applicant: Michele Mosca, Waterloo (CA)

(72) Inventors: Michele Mosca, Waterloo (CA); Priyanka Mukhopadhyay, Waterloo (CA); Vlad Gheorghiu, Kitchener (CA)

(73) Assignee: softwareQ Inc., Waterloo (CA)

( * ) Notice: Subject to any disclaimer, the term of this patent is extended or adjusted under 35 U.S.C. 154(b) by 585 days.

(21) Appl. No.: 17/532,273

(22) Filed: Nov. 22, 2021

(65) Prior Publication Data
US 2022/0164505 A1 May 26, 2022

Related U.S. Application Data

(60) Provisional application No. 63/198,930, filed on Nov. 23, 2020.

(51) Int. Cl.
*G06F 30/327* (2020.01)
*G06N 10/00* (2022.01)

(52) U.S. Cl.
CPC .......... *G06F 30/327* (2020.01); *G06N 10/00* (2019.01)

(58) Field of Classification Search
USPC ........................................ 716/105, 106, 107
See application file for complete search history.

(56) References Cited

U.S. PATENT DOCUMENTS 2,632,058 A 3/1953 Gray
2021/0406755 A1* 12/2021 Martiel .................. G06N 10/00

OTHER PUBLICATIONS

Matthew et al. (Polynomial-time T-depth Optimization of Clifford+T circuits via Matroid Partitioning, Institute for Quantum Computing, and Dept. of Combinatorics & Optimization, University of Waterloo, Ontario, Canada, Dec. 16, 2013) (Year: 2013).*

(Continued)

*Primary Examiner* — Brian Ngo
(74) *Attorney, Agent, or Firm* — CPST Intellectual Property Inc.; Brett J. Slaney

(57) ABSTRACT

The present application recognizes the problem of reducing the CNOT-count in Clifford+T circuits on connectivity constrained architectures. Here, one can "slice" the circuit at the position of Hadamard (H) gates and "build" the intermediate portions. Two kinds of partitioning are evaluated, namely: (i) a simple method of partitioning the gates of the input circuit based on the locality of H gates, and (ii) a second method of partitioning the phase polynomial of the input circuit. The intermediate {CNOT, T} sub-circuits can be synthesized using Steiner trees, similar to the work of Nash, Gheorghiu, Mosca [NGM20] and Kissinger, de Griend [KdG19]. The following algorithms have certain procedural differences that also help to further reduce the CNOT-count. The performances of the algorithms are compared while mapping different benchmark circuits as well as random circuits to some popular architectures like 9-qubit square grid, 16-qubit square grid, Rigetti 16qubit Aspen, 16-qubit IBM QX5, 20-qubit IBM Tokyo.

23 Claims, 15 Drawing Sheets

(56) References Cited

OTHER PUBLICATIONS

Matthew Amy, Parsiad Azimzadeh, and Michele Mosca. On the controlled-not complexity of controlled-not-phase circuits. Quantum Science and Technology, 4(1):015002, 2018.
Scott Aaronson and Daniel Gottesman. Improved simulation of stabilizer circuits.Physical Review A, 70(5):052328, 2004.
Matthew Amy, Dmitri Maslov, and Michele Mosca. Polynomial-time t-depth optimization of clifford+ t circuits via matroid partitioning. IEEE Transactions on Computer-Aided Design of Integrated Circuits and Systems, 33(10):1476-1489, 2014.
Matthew Amy, Dmitri Maslov, Michele Mosca, and Martin Roetteler. A meet-in-the-middle algorithm for fast synthesis of depth-optimal quantum circuits. IEEE Transactions on Computer-Aided Design of Integrated Circuits and Systems, 32(6):818-830, 2013.
Debjyoti Bhattacharjee and Anupam Chattopadhyay. Depth-optimal quantum circuit placement for arbitrary topologies. arXiv preprint arXiv:1703.08540, 2017.
Jaroslaw Byrka, Fabrizio Grandoni, Thomas Rothvoss, and Laura Sanità. Steiner tree approximation via iterative randomized rounding. Journal of the ACM (JACM), 60(1):1-33, 2013.
CJ Ballance, TP Harty, NM Linke, MA Sepiol, and DM Lucas. High-fidelity quantum logic gates using trapped-ion hyperfine qubits. Physical review letters, 117(6):060504, 2016.
Stephen Brierley. Efficient implementation of quantum circuits with limited qubit interactions. Quantum Information & Computation, 17(13-14):1096-1104, 2017.
Joseph W Britton, Brian C Sawyer, Adam C Keith, C-C Joseph Wang, James Freericks, Hermann Uys, Michael J Biercuk, and John J Bollinger. Engineered twodimensional ising interactions in a trapped-ion quantum simulator with hundreds of spins. Nature, 484(7395):489, 2012.
Alexander Cowtan, Silas Dilkes, Ross Duncan, Alexandre Krajenbrink, Will Simmons, and Seyon Sivarajah. On the qubit routing problem. arXiv preprint arXiv:1902.08091, 2019.
Amlan Chakrabarti, Susmita Sur-Kolay, and Ayan Chaudhury. Linear neighbor synthesis of reversible circuits by graph partitioning. arXiv:1112.0564, 2011.
Timothée Goubault de Brugiére, Marc Baboulin, Benoft Valiron, Simon Martiel, and Cyril Allouche. Quantum cnot circuits synthesis for nisq architectures using the syndrome decoding problem. In International Conference on Reversible Computation, pp. 189-205. Springer, 2020.
Christopher M Dawson, Andrew P Hines, Duncan Mortimer, Heny L Haselgrove, Michael A Nielsen, and Tobias J Osborne. Quantum computing and polynomial equations over the finite field z2. Quantum Information & Computation, 5(2):102-112, 2005.
Davide Ferrari and Michele Amoretti. Demonstration of envariance and parity learning on the ibm 16 qubit processor. arXiv preprint arXiv:1801.02363, 2018.
Richard P Feynman. Simulating physics with computers. Int. J. Theor. Phys, 21(6/7), 1982.
Gray Frank. Pulse code communication, Mar. 17, 1953. U.S. Pat. No. 2,632,058.
Daniel Gottesman. The heisenberg representation of quantum computers. ArXiv preprint quant-ph/9807006, 1998.
John P Gaebler, Ting Rei Tan, Y Lin, Y Wan, R Bowler, Adam C Keith, S Glancy, K Coakley, E Knill, D Leibfried, et al. High-fidelity universal gate set for be 9+ ion qubits. Physical review letters, 117(6):060505, 2016.
Yuichi Hirata, Masaki Nakanishi, Shigeru Yamashita, and Yasuhiko Nakashima. An efficient conversion of quantum circuits to a linear nearest neighbor architecture. Quantum Information and Computation, 11(1):142, 2011.
WK Hensinger, S Olmschenk, D Stick, D Hucul, M Yeo, M Acton, L Deslauriers, C Monroe, and J Rabchuk. T-junction ion trap array for two-dimensional ion shuttling, storage, and manipulation. Applied Physics Letters, 88(3):034101, 2006.
Frank K Hwang and Dana S Richards. Steiner tree problems. Networks, 22(1):55-89, 1992.
Kazuo Iwama, Yahiko Kambayashi, and Shigeru Yamashita. Transformation rules for designing cnot-based quantum circuits. In Proceedings of the 39th annual Design Automation Conference, pp. 419-424, 2002.
Toshinari Itoko, Rudy Raymond, Takashi Imamichi, Atsushi Matsuo, and Andrew W Cross. Quantum circuit compilers using gate commutation rules. In Proceedings of the 24th Asia and South Pacific Design Automation Conference, pp. 191-196, 2019.
Toshinari Itoko, Rudy Raymond, Takashi Imamichi, and Atsushi Matsuo. Optimization of quantum circuit mapping using gate transformation and commutation. Integration, 70:43-50, 2020.
Richard M Karp. Reducibility among combinatorial problems. In Complexity of computer computations, pp. 85-103. Springer, 1972.
Aleks Kissinger and Arianne Meijer-van de Griend. Cnot circuit extraction for topologically-constrained quantum memories. arXiv preprint arXiv:1904.00633, 2019.
Dax E Koh, Mark D Penney, and Robert W Spekkens. Computing quopit clifford circuit amplitudes by the sum-over-paths technique. Quantum Information & Computation, 17(13-14):1081-1095, 2017.
Joseph B Kruskal. On the shortest spanning subtree of a graph and the traveling salesman problem. Proceedings of the American Mathematical society, 7(1):48-50, 1956.
Prakash Murali, Jonathan M Baker, Ali Javadi-Abhari, Frederic T Chong, and Margaret Martonosi. Noise-adaptive compiler mappings for noisy intermediate-scale quantum computers. In Proceedings of the Twenty-Fourth International Conference on Architectural Support for Programming Languages and Operating Systems, pp. 1015-1029, 2019.
Prakash Murali, Ali Javadi-Abhari, Frederic T Chong, and Margaret Martonosi. Formal constraint-based compilation for noisy intermediate-scale quantum systems. Microprocessors and Microsystems, 66:102-112, 2019.
Ashley Montanaro. Quantum circuits and low-degree polynomials over. Journal of Physics A: Mathematical and Theoretical, 50(8):084002, 2017.
Atsushi Matsuo and Shigeru Yamashita. Changing the gate order for optimal lnn conversion. In International Workshop on Reversible Computation, pp. 89-101. Springer, 2011.
Beatrice Nash, Vlad Gheorghiu, and Michele Mosca. Quantum circuit optimizations for nisq architectures. Quantum Science and Technology, 5(2):025010, 2020.
Ryan O'Donnell. Analysis of boolean functions. Cambridge University Press, 2014.
Alexandru Paler. On the influence of initial qubit placement during nisq circuit compilation. In International Workshop on Quantum Technology and Optimization Problems, pp. 207-217. Springer, 2019.
Ketan N Patel, Igor L Markov, and John P Hayes. Optimal synthesis of linear reversible circuits. Quantum Information & Computation, 8(3):282-294, 2008.
John Preskill. Quantum computing in the nisq era and beyond. Quantum, 2:79, 2018.
Massoud Pedram and Alireza Shafaei. Layout optimization for quantum circuits with linear nearest neighbor architectures. IEEE Circuits and Systems Magazine, 16(2):62-74, 2016.
Alexandru Paler, Alwin Zulehner, and Robert Wille. Nisq circuit compilers: search space structure and heuristics. arXiv preprint arXiv:1806.07241, 2018.
Daniel Ruffinelli and Benjamín Barán. Linear nearest neighbor optimization in quantum circuits: a multiobjective perspective. Quantum Information Processing, 16(9):220, 2017.
Md Mazder Rahman and Gerhard W Dueck. Synthesis of linear nearest neighbor quantum circuits. arXiv preprint arXiv:1508.05430, 2015.
Matthew Reagor, Christopher B Osborn, Nikolas Tezak, Alexa Staley, Guenevere Prawiroatmodjo, Michael Scheer, Nasser Alidoust, Eyob A Sete, Nicolas Didier, Marcus P da Silva, et al. Demonstration of universal parametric entangling gates on a multi-qubit lattice. Science advances, 4(2):eaao3603, 2018.
Victor J Rayward-Smith and A Clare. 16(3):283-294, 1986.
Gabriel Robins and Alexander Zelikovsky. Tighter bounds for graph steiner tree approximation. SIAM Journal on Discrete Mathematics, 19(1):122-134, 2005.

(56) References Cited

OTHER PUBLICATIONS

Afshin Sadeghi and Holger Fröhlich. Steiner tree methods for optimal sub-network identification: an empirical study. BMC bioinformatics, 14(1):144, 2013.

Peter W Shor. Polynomial-time algorithms for prime factorization and discrete logarithms on a quantum computer. SIAM review, 41(2):303-332, 1999.

Vivek V Shende and Igor L Markov. On the cnot-cost of toffoli gates. Quantum Information & Computation, 9(5):461-486, 2009.

Vivek V Shende, Aditya K Prasad, Igor L Markov, and John P Hayes. Reversible logic circuit synthesis. In Proceedings of the 2002 IEEE/ACM international conference on Computer-aided design, pp. 353-360, 2002.

Marcos Yukio Siraichi, Vinícius Fernandes dos Santos, Sylvain Collange, and Fernando Magno Quintão Pereira. Qubit allocation. In Proceedings of the 2018 International Symposium on Code Generation and Optimization, pp. 113-125 2018.

Alireza Shafaei, Mehdi Saeedi, and Massoud Pedram. Optimization of quantum circuits for interaction distance in linear nearest neighbor architectures. In 2013 50th ACM/EDAC/IEEE Design Automation Conference (DAC), pp. 1-6. IEEE, 2013.

Alireza Shafaei, Mehdi Saeedi, and Massoud Pedram. Qubit placement to minimize communication overhead in 2d quantum architectures. In 2014 19th Asia and South Pacific Design Automation Conference (ASP-DAC), pp. 495-500. IEEE, 2014.

Mehdi Saeedi, Robert Wille, and Rolf Drechsler. Synthesis of quantum circuits for linear nearest neighbor architectures. Quantum Information Processing, 10(3):355-377, 2011.

Davide Venturelli, Minh Do, Eleanor Rieffel, and Jeremy Frank. Compiling quantum circuits to realistic hardware architectures using temporal planners. Quantum Science and Technology, 3(2):025004, 2018.

Richard Versluis, Stefano Poletto, Nader Khammassi, Brian Tarasinski, Nadia Haider, David J Michalak, Alessandro Bruno, Koen Bertels, and Leonardo DiCarlo. Scalable quantum circuit and control for a superconducting surface code. Physical Review Applied, 8(3):034021, 2017.

SM Wang. A multiple source algorithm for suboptimum steiner trees in graphs. In Proc. International Workshop on Graphtheoretic Concepts in Computer Science (H. Noltemeier, ed.), Trauner, Wurzburg, pp. 387-396, 1985.

Robert Wille, Lukas Burgholzer, and Alwin Zulehner. Mapping quantum circuits to ibm qx architectures using the minimal number of swap and h operations. In 2019 56th ACM/IEEE Design Automation Conference (DAC), pp. 1-6. IEEE, 2019.

Jonathan Welch, Daniel Greenbaum, Sarah Mostame, and Alán Aspuru-Guzik. Efficient quantum circuits for diagonal unitaries without ancillas. New Journal of Physics, 16(3):033040, 2014.

Robert Wille, Oliver Keszocze, Marcel Walter, Patrick Rohrs, Anupam Chattopadhyay, and Rolf Drechsler. Look-ahead schemes for nearest neighbor optimization of 1d and 2d quantum circuits. In 2016 21st Asia and South Pacific design automation conference (ASP-DAC), pp. 292-297. IEEE, 2016.

Alwin Zulehner, Alexandru Paler, and Robert Wille. An efficient methodology for mapping quantum circuits to the ibm qx architectures. IEEE Transactions on Computer-Aided Design of Integrated Circuits and Systems, 38(7):1226-1236, 2018.

\* cited by examiner

Algorithm 1: LINEAR-TF-SYNTH

Input: (i) Linear transformation matrix $A_{n \times n+1} = [A'_{n \times n} | b_{n \times 1}]$, (ii) Connectivity graph $G$.
Output: A circuit over {CNOT, X} realizing A.

1   $\mathcal{Y}_1, \mathcal{Y}_2, \mathcal{X} \leftarrow \emptyset, G' \leftarrow G$ ;                                     // Make a copy of $G$ ;
2   If $A_{n+1,i} = 1$ then $\mathcal{X}.append(X_i)$ and $A_{n+1,i} \leftarrow 0$ ;
3   for *columns* $i = 1, \ldots, n$ do
4   $\quad$ If $A_{i,i} = 0$, find all rows $j (j > i)$ such that $A_{j,i} = 1$. Choose $j$ with the shortest path (in $G'$) to $i$.
    $\quad$ Suppose $i$ is the root and $j$ is the leaf. $\mathcal{Y}_1.append(\text{CNOT}_{uv})$ if $u$ is the child of $v$.
    $\quad$ $A[v,:] \leftarrow A[v,:] \oplus A[u,:]$ ;
5   $\quad$ $S' = \{j : j > i \text{ and } A_{j,i} = 1\}, S \leftarrow S' \cup \{i\}$ ;           // $S$ is the set of terminals. ;
6   $\quad$ Find a minimum Steiner tree approximation with connectivity graph $G'$ and terminals $S$. Let $i$ be the
    $\quad$ root of this tree, $T_{i,S}$. ;
7   $\quad$ $\mathcal{Y} \leftarrow \emptyset$, $dig \leftarrow 1$ ;
8   $\quad$ $(\mathcal{Y}, A) \leftarrow \text{ROW-OP}(A, S, i, T_{i,S}, dig)$ ;
9   $\quad$ $\mathcal{Y}_1.append(\mathcal{Y}), G' \leftarrow G' \setminus \{i\}$                  // Remove vertex $i$ and its edges from $G'$. ;
10  end
11  Transpose $A$ and $G' \leftarrow G$ ;

FIG. 3(a)

```
12  for columns i = 1,...,n do
13      Repeat steps 3-6 ;
14      Y ← ∅;    alg ← 2 ;
15      (Y, A, T₁) ← ROW-OP(A, S, i, T₁,ₛ, alg) ;
16      Y₂.append(Y) ;
17      Initialize an array B of size n and B[ℓ] ← r if ℓ ∈ S \ {i} and r is the root of the sub-tree in which ℓ
            was a leaf ;
18      t ← |T₁| ;
19      for j = 0,..., t - 1 do
20          (r, ℓ₁,..., ℓₘ) ← T₁[j] ;
21          while ∃k such that ℓₖ < r do
22              ℓ ← ℓₖ ;
23              while r > ℓ do
24                  S ← {r, ℓ} ;   Tᵣ,ₛ ← The shortest path between r and ℓ stored as tree with root r and leaf
                          ℓ ;   Y ← ∅;    alg ← 3 ;
25                  (Y, A) ← ROW-OP(A, S, r, Tᵣ,ₛ, alg) ;
26                  Y₂.append(Y) ;
27                  B[ℓ] = B[r],   r ← B[r] ;
28              end
29          end
30      end
31      G' ← G' \ {i} ;
32  end
33  Y'₂ = Y₂ with control and target flipped for each CNOT gate ;
34  return Y'₂ ∪ reverse(Y₁) ∪ X as the circuit.
```

FIG. 3(b)

Algorithm 2: ROW-OP

Input: (i) Linear transformation matrix $A$, (ii) Set of terminals $S$, (iii) Pivot node $c$, (iv) A minimal Steiner tree approximation $T_{c,S}$, (v) $alg \in \mathbb{Z}$.

Output: (i) List $\mathcal{Y}$ of CNOT operations, (ii) $A$ (after the row operations).

1. $\mathcal{T} \leftarrow \text{SEPARATE}(T_{c,S}, c, S, alg)$  // Separate $T_{c,S}$ into a set $\mathcal{T}$ of edge-disjoint sub-trees $T_{k,S_k}$ with root $k \in S$ and leaves $S_k \setminus \{k\} \subset S$. ;
   $\mathcal{T}_1 = \{(r, \ell_1, \ldots, \ell_m) : r \text{ is the root and } \ell_1, \ldots, \ell_m \text{ are the leaves in a sub-tree}\}$ if $alg == 2$.
2. $\mathcal{T}_1 = \{(r, \ell_1, \ldots, \ell_m) : r \text{ is the root and } \ell_1, \ldots, \ell_m \text{ are the leaves in a sub-tree}\}$ ;
3. $t \leftarrow |\mathcal{T}|; \mathcal{Y} \leftarrow \emptyset$ ;
4. for $i = t - 1, t - 2, \ldots, 0$ do  // Starting from the last sub-tree
5.     if $alg \neq 1$ then
6.         *(Bottom-Up-1:)* Starting from the last layer till layer 1, $\mathcal{Y}.append(\text{CNOT}_{uv})$ if $u$ is a non-root parent node and $v$ is a child of $u$. ;
7.         if $alg \neq 4$ then
8.             $A[v, :] \leftarrow A[v, :] \oplus A[u, :]$ ;
9.         end
10.     end
11.     *(Top-Down-1:)* Starting from top layer till last layer, $\mathcal{Y}.append(\text{CNOT}_{uv})$ if $u$ is parent of $v$. ;
12.     if $alg \neq 4$ then
13.         $A[v, :] \leftarrow A[v, :] \oplus A[u, :]$ ;
14.     end

FIG. 4(a)

15  (*Bottom-Up-2:*) Starting from the last layer till layer 0, $\mathcal{Y}.append(CNOT_{uv})$ if $u$ is a parent node and $v$ is a non-leaf child node of $u$. ;
16  if $alg \neq 4$ then
17  | $A[v,:] \leftarrow A[v,:] \oplus A[u,:]$ ;
18  end
19  if $alg \neq 1$ then
20  | (*Top-Down-2:*) Starting from the second layer till last layer, $\mathcal{Y}.append(CNOT_{uv})$ if $u$ is a parent node (that is not a child of the root) and $v$ is a non-leaf child of $u$. ;
21  | if $alg \neq 4$ then
22  | | $A[v,:] \leftarrow A[v,:] \oplus A[u,:]$ ;
23  | end
24  end
25  if $alg == 4$ then
26  | $A[r,:] \leftarrow A[r,:] \oplus A[\ell,:]$, where $r, \ell$ are the root and leaf of the current sub-tree respectively. ;
27  end
28  end
29  if $alg \neq 2$ then
30  | return $(\mathcal{Y}, A)$ ;
31  else
32  | return $(\mathcal{Y}, A, \mathcal{T}_1)$ ;
33  end

FIG. 4(b)

Algorithm 3: SEPARATE

Input: (i) Steiner tree $T_{c,S}$, (ii) Pivot $c$, (iii) Set of terminals $S$, (iv) $alg \in \mathbb{Z}$.
Output: $\mathcal{T} = \{T_{k,S_k} : \text{Edge-disjoint sub-trees with root } k \in S \text{ and leaves } S_k \setminus \{k\} \subset S\}$.

1  $\mathcal{T} \leftarrow \emptyset$, $root \leftarrow c$, $R \leftarrow \{root\}$, $S.delete(c)$ ;
2  while $S \neq \emptyset$ do
3    $S_{root} \leftarrow \{root\}$, $T_{root,S_{root}} \leftarrow \emptyset$    // Initialize the data-structure to store a sub-tree ;
4    Starting from $root$, traverse $T_{c,S}$ in breadth first search order. Store the vertices and edges in $T_{root,S_{root}}$ ;
5    When arriving at a non-leaf terminal $u$, then $S_{root}.append(u)$ and store $u$ as a leaf in $T_{root,S_{root}}$. $S.delete(u)$, $R.append(u)$ ;
6    if $alg \neq 4$ then
7      $\mathcal{T}.append(T_{root,S_{root}})$    // Store the tree-information depth-wise.;
8    else
9      for $u \in S_{root} \setminus \{root\}$ do
10       $S_u \leftarrow \{u, root\}$ ;
11       $T_{u,S_u} \leftarrow$ Path from $u$ to $root$    // Store the tree as if $u$ is root and $root$ is leaf. ;
             $\mathcal{T}.append(T_{u,S_u})$ ;
12     end
13   end
14   $R.delete(root)$, $root \leftarrow R[0]$ ;
15 end
16 return $\mathcal{T}$ ;

FIG. 5

Algorithm 4: PHASE-NW-SYNTH

Input: (i) $\mathcal{P} \in \{(c,f) : c \in \mathbb{Z}_8 \text{ and } f \in (\mathbb{F}_2)^* \times \mathbb{F}_2\}$, (ii) Connectivity graph $G$.
Output: A circuit with gates in $\mathcal{G}_{ph} = \{CNOT, X, T, T^\dagger, Ph, Ph^\dagger, Y, Z\}$ realizing the phase polynomial network given by $\mathcal{P}$.

1  $\mathcal{Y} \leftarrow \emptyset$, $I \leftarrow [n]$;  $\mathcal{K} \leftarrow \emptyset$   // Initialize an empty stack $\mathcal{K}$. ;
2  If $(c_i, x_i) \in \mathcal{P}$ or $(c_i, 1 \oplus x_i) \in \mathcal{P}$ for $i \in [n]$ then $\mathcal{Y}$.append($U[i]$) or $\mathcal{Y}$.append($X[i]U[i]$) respectively, where $U[i] \in \mathcal{G}_{ph}$ is determined by $c_i$. Then delete these terms from $\mathcal{P}$. ;
3  Construct the parity matrix $\mathbf{P}_{n+2 \times p}$ where $p = $ number of terms in $\mathcal{P}$, the first $n$ rows of each column is a parity term (without bit flip term), $n+1^{th}$ row stores the bit flip and $n+2^{th}$ row stores the coefficients ;
4  $B \leftarrow \{p_i : p_i = [(\mathbf{P}[0 : n-1, i])^T ||i||^T\} \text{ // } p_i$ is the first $n$ rows of $i^{th}$ column of $P$, appended by $i$, the column index. ;
5  if $B \neq \emptyset$ then
6  | $\mathcal{K}$.push($B, I, \epsilon$) ;
7  end

FIG. 6(a)

```
 8  while 𝒦 ≠ ∅ do
 9      (B, I, i) ← 𝒦.pop();
10      if i ∈ N then
11          S' ← {k ∈ [n]: k ≠ i and p_k = 1  ∀p ∈ B};
12          if S' ≠ ∅ then
13              S = S' ∪ {i};     alg ← A;
14              Find a minimum Steiner tree approximation with connectivity graph G|_{I∪{i}} and terminals S.
15              Let i be the root of this tree, T_{i,S};
16              A = Matrix with columns p ∈ B' such that (B', I', i') ∈ 𝒦 ∪ (B, I, i);
17              (𝒪, A) ← ROW-OP(A, S|_i, T_{i,S}, A);
18              𝒴 ← ∅;
19              𝒴.append(𝒪);
20              if ∃p ∈ B' where (B', I', i') ∈ 𝒦 ∪ (B, I, i) such that p_k = 0 for k ∈ [n] and k ≠ i then
21                  At the place in the circuit where the parity given by p_n^{th} column of P is realized, place
                    (append in 𝒴) X𝒰 or 𝒰 (accordingly);
22                  B'.delete(p);
23              end
24          end
        end
    end
```

FIG. 6(b)

```
25    j ← argmax_{j∈I} max_{x∈P_2} |{p ∈ B : p_j = x}| ;
26    B_0 ← {p ∈ B : p_j = 0};   B_1 ← {p ∈ B : p_j = 1} ;
27    if B_1 ≠ ∅ then
28    │   if i = ϵ then
29    │   │   K.push(B_1, I \ {j}, j) ;
30    │   else
31    │   │   K.push(B_1, I \ {j}, i) ;
32    │   end
33    end
34    if B_0 ≠ ∅ then
35    │   K.push(B_0, I \ {j}, i) ;
36    end
37 end
38 return Y' ;
```

FIG. 6(c)

Algorithm 5: CNOT-OPT-A

Input: (i) Circuit $C_I$ with {CNOT, T, T†, Ph, Ph†, X, Y, Z, H} gates, (ii) Connectivity graph $G$.
Output: Circuit $C_O$ with CNOT gates respecting connectivity constraints imposed by $G$.

1   $C_O \leftarrow \emptyset$;   $i = -1$;   $gate = START$;
2   while $gate! = EOF$ do
3       $i \leftarrow i+1$;   $gate = C_O[i]$;   $Q = (x_1, x_2, \ldots, x_n)$;   $\mathcal{P} \leftarrow \emptyset$;
4       while $gate! = H$ or $gate! = EOF$ do
5           Update $Q$ and $\mathcal{P}$ according to the rules described in Section 4.1;
6           $i \leftarrow i + 1$;   $gate = C_O[i]$;
7       end
8       $C_{ph}, C_{lin} \leftarrow \emptyset$;
9       $C_{ph} \leftarrow$ PHASE-NW-SYNTH$(\mathcal{P}, G)$;
10      $Q_{ph} \leftarrow$ state of the qubits after $C_{ph}$;
11      $A \leftarrow$ linear transformation mapping $Q_{ph}$ to $Q$;
12      $C_{lin} \leftarrow$ LINEAR-TF-SYNTH$(A, G)$;
13      $C_O.append(C_{ph}, C_{lin}, H[k])$;   // $k$ is the position of H;
14  end
15  return $C_O$;

FIG. 7

Algorithm 6: CNOT-OPT-B

Input: (i) Circuit $C_I$ with {CNOT, T, T$^\dagger$, Ph, Ph$^\dagger$, X, Y, Z, H} gates, (ii) Connectivity graph $G$.
Output: Circuit $C_O$ with CNOT gates respecting connectivity constraints imposed by $G$.

1   $C_O \leftarrow \emptyset$;
2   From $C_I$ calculate $\mathcal{D} = \langle \mathcal{P}, \mathcal{Q}, \mathcal{H} \rangle$;   $k \leftarrow |\mathcal{H}|$;    // Described in Section 4;
3   $Q_{int} = (x_1, x_2, \ldots, x_n)$;   $Q_{out} = Q$ ;
4   for $1 \leq i \leq k$ do
5     $h \leftarrow \mathcal{H}_i$; $C_{ph} \leftarrow \emptyset$; $C_{lin} \leftarrow \emptyset$ ;
6     $\mathcal{P}' \leftarrow \{(c, f) \in \mathcal{P} : f \in \text{span}(h.Q_I) \text{ but } f \notin \text{span}(h.Q_O)\}$ ;
7     if $\mathcal{P}' \neq \emptyset$ then
8       $\mathcal{P}.delete(\mathcal{P}')$ ;
9       $\mathcal{P}_{Q_{int}} \leftarrow \{(c, f) \in \mathcal{P}' \text{ in the basis } Q_{int}\}$ ;
10      $C_{ph} \leftarrow \text{PHASE-NW-SYNTH}(\mathcal{P}_{Q_{int}}, G)$ ;
11      $Q_{ph} \leftarrow$ state of the qubits after $C_{ph}$ ;
12      $A \leftarrow$ linear transformation mapping $Q_{ph}$ to $h.Q_I$ ;
13      $C_{lin} \leftarrow \text{LINEAR-TF-SYNTH}(A, G)$ ;
14     end
15    $Q_{int} \leftarrow h.Q_O$ ;
16    $C_O.append(C_{ph}, C_{lin}, H[k])$ where $k = h.Pos$ ;
17   end

FIG. 8(a)

```
18  C_ph ← ∅;  C_lin ← ∅;
19  if P ≠ ∅ then
20  |   P_{Q_init} = {(c,f) ∈ P in the basis Q_init};
21  |   C_ph ← PHASE-NW-SYNTH(P_{Q_init}, G);
22  |   Q_ph ← state of the qubits after C_ph;
23  else
24  |   Q_ph ← Q_init;
25  end
26  A ← linear transformation mapping Q_ph to Q_out;
27  C_lin ← LINEAR-TF-SYNTH(A, G);
28  C_O.append(C_ph, C_lin);
29  return C_O;
```

FIG. 8(b)

Algorithm 7: Steiner Tree Algorithm

Input: (i) A graph $G = (V, E)$, (ii) Terminal set $S = \{s_1, \ldots, s_k\} \subseteq V$
Output: A Steiner tree constructed from $G$ 1 Construct a forest $F$ of $k$ sub-graphs $f_1, \ldots, f_k$ consisting of one terminal each ;
2 while *does not exist a $f_i \in F$ such that all terminals $s_1, \ldots, s_k$ $\inf_i$* do
3      for *all $i \neq j$* do
4          Determine the shortest path between all nodes in $f_i$ to all those in $f_j$ ;
5      end
6      Find the minimum length path $P$ among all computed paths ;
7      Construct $f_n = f_i \cap f_j \cap P$ and add it to forest $F$ ;
8 end
9 Construct a minimum spanning tree $T$ on $f_i$ ;
10 Remove non-terminal nodes of degree 1 from $T$ ;
11 return $T$ ;

FIG. 9

SYSTEM AND METHOD FOR REDUCING CNOT COUNT IN CLIFFORD+T CIRCUITS ON CONNECTIVITY CONSTRAINED ARCHITECTURES

CROSS-REFERENCE TO RELATED APPLICATION(S)

This application claims priority to U.S. Provisional Application No. 63/198,930 filed on Nov. 23, 2020, the contents of which are incorporated herein by reference.

TECHNICAL FIELD

The following relates to systems and methods for reducing CNOT count in Clifford+T circuits on connectivity constrained architectures.

BACKGROUND

Quantum computing is a paradigm which is predicted to provide significant speedups for problems like factorization [Sho99] and simulation of quantum systems [Fey82], that are believed to be intractable on a classical computer. Somewhat similar to its classical counterpart, a circuit using elementary unitary operations remains the most popular model for representing quantum computation. Thus, there is a need for efficient quantum compilers that map a high-level algorithm into a lower-level form, i.e. a quantum circuit, having quantum gates that are admissible by the hardware constraints.

Currently, there is a desire to have large-scale quantum computers. Instead, the devices available currently are referred to as noisy intermediate-scale quantum (NISQ) computers [Pre18]. The popular technologies that realize these devices like superconducting quantum circuits [ROT+18, VPK+17] and ion traps [BSK+12, BHL+16, GTL+16, HOS+06] impose certain connectivity constraints by which two-qubit operations are possible only among certain pairs of physical qubits. Naively, one can insert SWAP operators to move a pair of logical qubits to physical positions admissible for two-qubit operations. However, this increases the number of two-qubit operations, each of which again introduces what can be significant noise. Hence, it is important to optimize the number of two-qubit operators while taking care of the connectivity constraints.

SUMMARY

While mapping a quantum circuit to the physical layer one should consider the numerous constraints imposed by the underlying hardware architecture. Connectivity of the physical qubits is one such constraint that restricts two-qubit operations like CNOT to "connected" qubits. SWAP gates can be used to place the logical qubits on admissible physical qubits, but they entail a significant increase in CNOT-count, considering the fact that each SWAP gate can be implemented by 3 CNOT gates.

The following recognizes the problem of reducing the CNOT-count in Clifford+T circuits on connectivity constrained architectures. Here, one can "slice" the circuit at the position of Hadamard (H) gates and "build" the intermediate portions. Two kinds of partitioning are evaluated, namely: (i) a simple method of partitioning the gates of the input circuit based on the locality of H gates, and (ii) a second method of partitioning the phase polynomial of the input circuit. The intermediate {CNOT, T} sub-circuits can be synthesized using Steiner trees, similar to the work of Nash, Gheorghiu, Mosca [NGM20] and Kissinger, de Griend [KdG19]. The following algorithms have certain procedural differences that also help to further reduce the CNOT-count. The performances of the algorithms are compared while mapping different benchmark circuits as well as random circuits to some popular architectures like 9-qubit square grid, 16-qubit square grid, Rigetti 16 qubit Aspen, 16-qubit IBM QX5, 20-qubit IBM Tokyo. It has been found that for both the benchmark and random circuits the first algorithm using the simple slicing technique performs better, i.e. provides a lower CNOT-count than the count obtained by using SWAP gates. The second slice-and-build algorithm performs well for benchmark circuits.

In one aspect, there is provided a method of partitioning gates of an input circuit based on the locality of H gates, comprising: partitioning the gates of a given circuit according to a position of the H gates; and generating a phase polynomial of the intermediate circuits.

In another aspect, there is provided a method of synthesizing CNOT+Rz circuits using Steiner trees, comprising: computing a Steiner tree according to Steiner rows and terminal rows; for each root to leaf path, flipping the role of the root and leaf, such that parity gets accumulated at the root; and adding up the parities to obtain a desired parity, wherein a matrix is changes according to the un-flipped leaf and root to reflect changes due to position of CNOT gates.

In yet another aspect, there is provided a method of synthesizing CNOT+X circuits, comprising: while synthesizing CNOT+X circuits: (a) reducing to upper triangle, wherein at least one CNOT is not used to unnecessarily eliminate parities of terminal rows; and (b) transposing and reducing again to upper triangle without disturbing the zeros in the now lower triangle, wherein the template or recursive procedures are not used, information about the errant rows is obtained from Steiner trees already constructed, and correction procedures are used to correct these rows.

BRIEF DESCRIPTION OF THE DRAWINGS

Embodiments will now be described with reference to the appended drawings wherein:

FIGS. 3(a) and 3(b) provide an example of a linear-tf-synth algorithm (Algorithm 1).

FIGS. 4(a) and 4(b) provide an example of a row-op algorithm (Algorithm 2).

FIG. 5 is an example of a separate algorithm (Algorithm 3).

FIGS. 6(a)-6(c) provide an example of a phase-nw-synth algorithm (Algorithm 4).

FIG. 7 is an example of a CNOT-opt-a algorithm (Algorithm 5).

FIGS. 8(a) and 8(b) provide an example of a CNOT-opt-b algorithm (Algorithm 6).

FIG. 9 is an example of a Steiner tree algorithm (Algorithm 7).

DETAILED DESCRIPTION

Figure 1B:
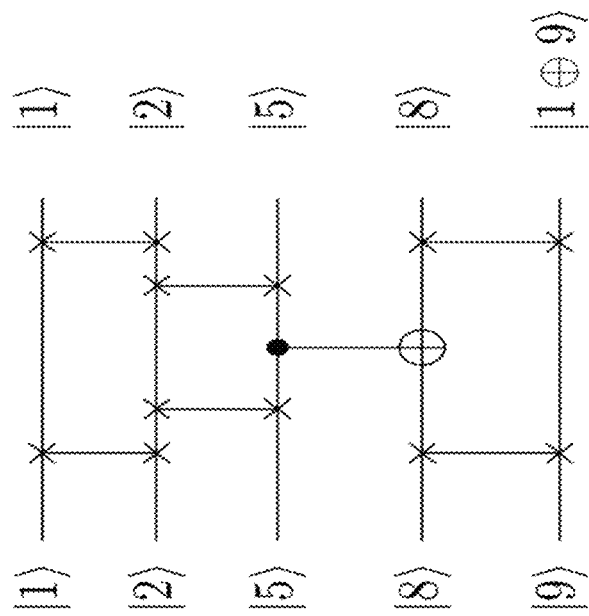
FIG. 1(b) illustrates CNOT1,9 with SWAPs.

It is recognized that a significant number of currently available quantum computing processors (QPUs) have their qubits placed in certain physical configurations (positions), e.g. on a rectangular lattice. While operating on those qubits, the QPU can only perform certain operations (2 qubit interactions) on neighboring qubits, where the notion of "neighbors" is defined by the physical configuration mentioned above. Therefore, translating a quantum algorithm to a sequence of quantum operations that respects the QPU connectivity can be considerably important, and any optimizations performed in this translation phase have drastic impact on the length (and implicitly, on the precision) of the underlying computation.

In the following, the problem of optimizing such mapping for a specific set of universal quantum instructions (gates) is addressed, i.e. for the Clifford+T set, which is generated by the gates {H, CNOT, T}, where H and T are 1-qubit gates, and CNOT is a 2-qubit gate. A new algorithm has been designed and implemented that reduces (in comparison with previously known techniques) the number of CNOT gates required to meet the connectivity constraints imposed by the physical hardware architectures. The connectivity constraints are represented in the form of a graph G in which the vertices represent qubits and a two-qubit operation can be applied if and only if the corresponding vertices are connected by an edge in G.

This new approach can be described herein as slice-and-build. Given a circuit as a sequence of gates, one can slice it at "suitable" points and re-synthesize or build the intermediate sliced portions in a manner such that connectivity constraints are respected while at the same time reducing the number of CNOT gates. The following methods are herein provided for such a slice-and-build approach.

First, a new method of partitioning the gates-of the input circuit based on the locality of H gates. This approach includes first partitioning the gates of the given circuit according to the position of the H gates and then generating the phase polynomial of the intermediate {CNOT, T, X} circuits. This new method can substantially reduce CNOT-count in comparison to approaches that calculate the phase polynomial for the whole circuits first and partition around the H gates after.

Second a new method of synthesis CNOT+Rz circuits using Steiner trees is presented. This method uses Steiner trees in a unique way to get the correct "parity terms". Here one can compute a Steiner tree according to Steiner rows and terminal rows. For each root to leaf path, one can flip the role of the root and leaf, so that parity gets accumulated at the root. These parities get added up to give us the correct parity we want. While changing the matrix we change it according to the un-flipped leaf and root. This is to reflect the changes due to position if CNOT gates.

Third, a new method for synthesizing linear CNOT+X circuits is presented. While synthesizing CNOT+X circuits, there are two parts: (a) reduce to upper triangle, and (b) transpose and reduce again to upper triangle without disturbing the 0s in the "now" lower triangle. In part (a) certain steps can be optimized. In particular, some CNOTs are not used, to unnecessarily eliminate some parities of terminal rows. This gives a reduction by a factor of 2. In part (b), the template or recursive procedures are not used, as was done before. One can obtain information about the "errant" rows from the Steiner trees already constructed. Then, one can use some correction procedures to correct these rows. The way the trees are ordered ensures that the errant rows get corrected and no further disturbance occurs.

In the following, the problem of re-synthesizing a circuit over the universal fault tolerant Clifford+T gate set is considered. An algorithm has been designed and implemented, which reduces the number of CNOT gates required to meet the connectivity constraints imposed by the physical hardware architectures. The connectivity constraints are represented in the form of a graph G in which the vertices represent qubits and a two-qubit operation can be applied if and only if the corresponding vertices are connected by an edge in G. One can assume without loss of generality that G, the connectivity graph is connected.

The Clifford+T gate set is one of the most popular fault-tolerant universal gate set used to realize a quantum operator [Got98, AG04]. A minimal generating set for this group is {CNOT, H, Ph, T}. Consider the following gates in this set: Guniv={CNOT, H, T, T†, Ph, Ph†, X, Y, Z}, among these CNOT is the only multi-qubit operator. A CNOT gate acts on two qubits, one of which is referred to as the control (c) and the other as target (t). The control remaining unchanged, the state of the target qubit becomes c⊕t, i.e. CNOT|c,t>=|c, c⊕t>. If the shortest path length between vertices corresponding to c and t in G is l, then the naive way of using SWAP gates (equivalent to 3 CNOT gates) would require about 6(l−1) CNOT gates. FIG. 1(a) illustrates a 9-qubit square grid, and FIG. 1(b) illustrates CNOT1,9 with SWAPs.

Figure 1A:
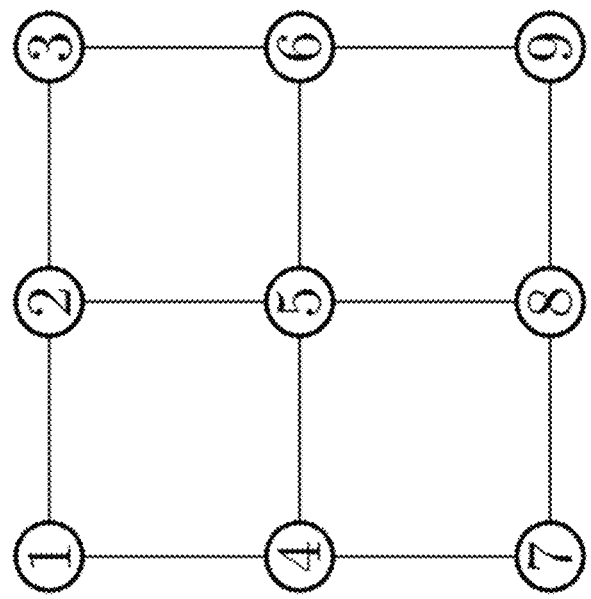
FIG. 1(a) illustrates a 9-qubit square grid.

As seen in FIG. 1, in the SWAP template SWAP gates are placed along the shortest path between two qubits on the given connectivity graph, in this case a 9-qubit square grid (FIG. 1(a)). When the required logical qubits are on adjacent physical qubits (FIG. 1(b)) then CNOT is applied. SWAP gates are again placed to get the correct logical value on all physical qubits.

Thus, heuristic algorithms have been developed using Steiner trees that reduce the number of CNOT gates. Steiner trees were also used by Nash, Gheorghiu, Mosca [NGM20] and Kissinger, de Griend [KdG19] for a similar goal of reducing CNOT gates but for restricted class of circuits using {CNOT, Rz} gates, where Rz is the gate that applies a rotation on the qubit state about the Z-axis on the Bloch sphere. Even for these restricted circuits the present algorithms differ from these works, which is described in greater below.

As noted above, the new approach described herein can be described as slice-and-build. Given a circuit $C_l$ as a sequence of gates one can slice it at "suitable" points and re-synthesize or build the intermediate sliced portions in a manner such that connectivity constraints are respected and at the same time we tried to reduce the number of CNOT gates. The following describes two methods for slice-and-build.

The first procedure, CNOT-OPT-A (FIG. 7—Algorithm 5) described in Section 4.1, has a simple slicing technique. One can partition the circuit $C_l$ at the position of the Hadamard (H) gates. Each intermediate sub-circuit composed of the gates $G_{ph}$={CNOT, T, T†, Ph, Ph†, X, Y, Z}, can be re-synthesized using algorithms PHASE-NW-SYNTH (FIG. 6—Algorithm 4) and LINEAR-TF-SYNTH (FIG. 3—Algorithm 1). For each sub-circuit one can first calculate the phase polynomial P and overall linear transformation $A_{slice}$. One can synthesize a phase polynomial network circuit $C_{ph}$ with the gates in $G_{ph}$, using PHASE-NW-SYNTH (FIG. 6—Algorithm 4) described in Section 3.2. The algorithm draws inspiration from the parity network synthesis algorithm by Amy, Azimzadeh and Mosca [AAM18]. Here, calculate the parity network matrix in which each column stores a parity term. The aim is to apply a series of transformations (CNOT gates) such that each parity term occurs at least once in the circuit. Then, depending on the coefficients of the parity terms, place the gates in $G_{ph}$\{CNOT, X}. To impose connectivity constraints, construct Steiner trees (Section 2.3) with terminals being the set of qubits (or vertices) satisfying certain conditions. Then, depending on the edge information, perform a series of CNOT operations to get the desired result.

Now, the phase polynomial network corresponding to P has some overall transformation $A_{ph}$. Next, synthesize a circuit $C_{lin}$ that implements the "residual" linear transformation $A=A_{ph}^{-1} A_{slice}$ using LINEAR-TF-SYNTH (FIG. 3—Algorithm 1), described in Section 3.1. A motivation of this algorithm comes from the work of Patel, Markov and Hayes [PMH08] that synthesizes a linear reversible circuit using CNOT gates. Follow the same reverse-engineering procedure where (i) reduce A first to an upper triangular form, (ii) transpose it and then (iii) reduce it to a lower triangular form so that one gets the identity matrix I. Each linear operation corresponds to a CNOT gate.

Similar to the approaches that have been taken in [NGM20, KdG19] for CNOT gate circuits, impose connectivity constraints by constructing series of Steiner trees. Apart from the fact that this approach considers circuits with $G_{lin}=\{CNOT, X\}$ gates, algorithmically use different procedures for reducing to upper (step (i)) and lower triangular form (step (iii)). In this way one can also manage to reduce the number of CNOT gates.

In the second procedure CNOT-OPT-B (FIG. 8—Algorithm 6) described in Section 4.2, the slicing points remain the H gates but the set that is partitioned is the phase polynomial $P_I$ of the entire circuit C. Between two H gates (including the ends), synthesize a phase polynomial network circuit using gates in $G_{ph}$ that realizes the partial phase polynomial $P_{sub}$, including terms in P that become incomputable after the H gate being placed at the end of the current slice. Here it should be noted that by the sum-over-paths formulation (Section 2.2) new path variables are introduced after application of each H gate. This renders some terms of the phase polynomial incomputable after certain points in the circuit. The synthesis of phase polynomial network is done using PHASE-NW-SYNTH (FIG. 6—Algorithm 4). Let $A_{slice}$ be the transformation that maps the state of the qubits in C, after the H gate at the beginning of a slice to the state of the qubits in C, before the H gate at the end of the slice. Synthesize a circuit implementing $A=A_{ph}^{-1} A_{slice}$ using LINEAR-TF-SYNTH (FIG. 3—Algorithm 1) such that between any two H gates (as well as at the ends) the linear transformation $A_{slice}$ remains unchanged. A similar kind of partitioning of the circuit according to the phase polynomial was used by Amy, Maslov and Mosca in [AMM14] where their goal was to reduce T-depth of the input circuit.

Results

Figure 2:
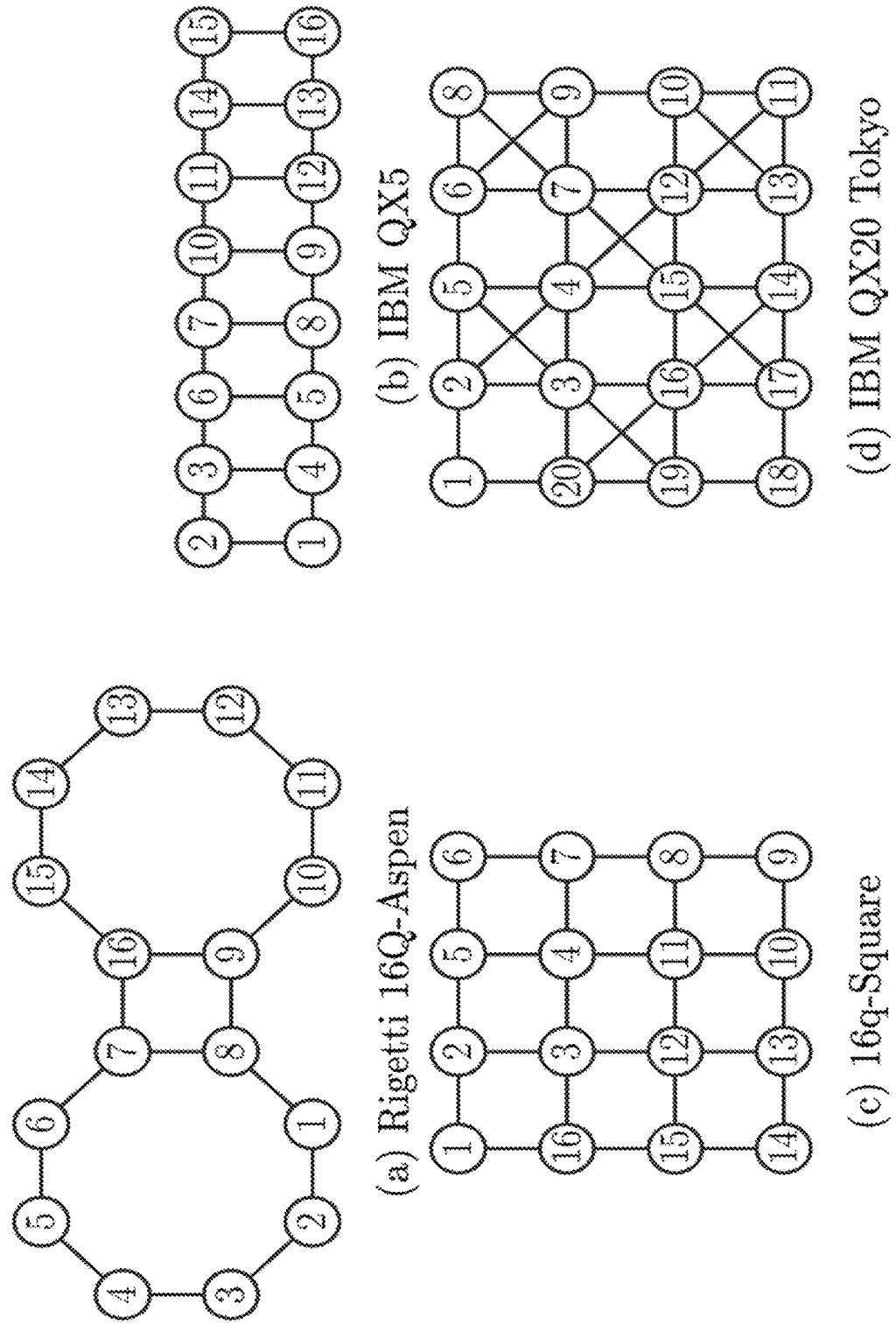
FIGS. 2(a) to 2(d) illustrate connectivity graphs of example architectures.

Some benchmark as well as randomly generated circuits have been synthesized after taking into account connectivity constraints imposed by some popular architectures shown in FIG. 1 and FIG. 2. FIG. 2 illustrates connectivity graphs of some particular architectures (images obtained from [dBBV+20]). Here, it may be emphasized that the performance of the procedures have been studied as baseline algorithms. The results can improve if coupled with some other procedures that handle the problem of optimal initial mapping of qubits. To be precise, the following has considered only one mapping where qubit i is mapped to vertex i of the given connectivity graphs. Considerable amount of work has been done, which considers the optimal mapping that reduces the resources required. So, if such a procedure is done as pre-processing, then the CNOT-count can reduce further.

The CNOT-count overhead, i.e. the increase in CNOT-count obtained from our algorithms, has been compared with the overhead obtained using SWAP-template (FIG. 1). It has been observed that both algorithms give significant improvement in case of benchmark circuits (Table 2 in Section 4.3). In case of random circuits, it has been found that the simple way of slicing in CNOT-OPT-A gives much less overhead compared to SWAP-template (Table 1 in Section 4.3).

1.1. Related Work

There have been quite a number of works that deal with the problem of CNOT optimization without taking into account the connectivity constraints imposed by the underlying hardware architecture. Some of them can be found in [IKY02, SPMH02, PMH08, SM09, O'D14, WGMAG14, AAM18].

Some authors like [LDX19, PS16, WKW+16, IRI+19, IRIM20] use SWAP gates along with some gate commutation and transformation rules to obtain a circuit that respect connectivity constraints. There are algorithms that take advantage of the restricted topology such as 1D linear nearest neighbor ([MY11, HNYN11, SWD11, CSKC11, SSP13, RD15]), hypercubic [Bri17] which rely on classical sorting networks and 2D grids ([SSP14, LWD15, WKW+16, RB17]). Some algorithms that work on general topology for NISQ devices are [ZPW18, BC17, SSCP18, LDX19, CDD+19, WBZ19]. Broadly, these algorithms use a qubit mapping technique to search for the optimal placement of SWAP gates and qubits. The search space scales exponentially for exact algorithms like [VDRF18, MJACM19], making them impractical for large NISQ devices. Thus, some authors like in [CDD+19, PZW18, LDX19] use heuristics to reduce the search space. Some of these heuristics algorithms like [ZPW18], which is based on depth partitioning and A*search are developed for specialized architecture like IBM devices. In [FA18] the authors give an approach for realizing arbitrary parity-function oracles, while taking care of the underlying topology. It has been shown in [Pal19] that the size of the resulting circuit is very sensitive to the original placement of the logical qubits on the device.

In [NGM20, KdG19] Steiner trees are used to reduce the number of CNOT gates while mapping quantum circuits over $\{CNOT, Rz\}$ gates to an arbitrary topology. With a similar goal of reducing the size of linear reversible CNOT circuits the authors in [dBBV+20] reduced the problem to a well-known cryptographic problem—the syndrome decoding problem.

1.2. Organization

After giving some preliminaries in Section 2 the present algorithms are described below in Sections 3 and 4. The algorithms LINEAR-TF-SYNTH (FIG. 3) and PHASE-NW-SYNTH (FIG. 6) that synthesize linear reversible circuits and phase polynomial network circuits are given in Sections 3.1 and 3.2 respectively. The algorithms CNOT-OPT-A (FIG. 7) and CNOT-OPT-B (FIG. 8) that synthesize the complete circuit over the Clifford+T gate set is described in Sections 4.1 and 4.2 respectively.

2. Preliminaries

One can write $N=2^n$ and $[K]=\{1, 2, \ldots, K\}$. The $(i, j)^{th}$ entry of any matrix M is denoted by $M_{i,j}$ or $M_{ij}$ or $M[i, j]$. We denote the $i^{th}$ row of M by $M[i, .]$ and the $j^{th}$ column by $M[., j]$. Here, one can denote the n×n identity matrix by $I_n$ or I if the dimension is clear from the context. The set of n-qubit unitaries of size $2n \times 2n$ is denoted by $U(2^n)$ or $U_n$.

2.1. Cliffords and Paulis

The single qubit Pauli matrices are as follows:

$$X = \begin{bmatrix} 0 & 1 \\ 1 & 0 \end{bmatrix} \quad (1)$$

$$Y = \begin{bmatrix} 0 & -i \\ i & 0 \end{bmatrix}$$

$$Z = \begin{bmatrix} 1 & 0 \\ 0 & -1 \end{bmatrix}$$

The n-qubit Pauli operators are:

$$P_n = \{Q_1 \otimes Q_2 \otimes \ldots \otimes Q_n : Q_i \in \{I, X, Y, Z\}\} \quad (2)$$

The single-qubit Clifford group $C_1$ is generated by the Hadamard and phase gate.

$$C1 = \langle H, Ph \rangle \quad (3)$$

where $$H = \frac{1}{\sqrt{2}} \begin{bmatrix} 1 & 1 \\ 1 & -1 \end{bmatrix} \quad (4)$$

$$Ph = \begin{bmatrix} 1 & 0 \\ 0 & i \end{bmatrix}$$

When n>1 the n-qubit Clifford group $C_n$ is generated by these two gates (acting on any of the n qubits) along with the two-qubit CNOT=$|0\rangle\langle 0|\otimes I + |1\rangle\langle 1|\otimes X$ gate (acting on pair of qubits). We write $CNOT_{c,t}$ to denote the CNOT gate applied between qubit c (control) and t (target). The logic realized by this gate is :CNOT|c,t>=|c, c⊕t>.

The Clifford+T gate set includes the n-qubit Clifford group gates along with the T gate, where $$T = \begin{bmatrix} 1 & 0 \\ 0 & e^{j\frac{\pi}{4}} \end{bmatrix} \quad (5)$$

It is easy to verify that this set is a group since the H and CNOT gates are their own inverses and $T^{-1}=T^7$. Here it is noted that $Ph=T^2$. For n>1 qubits a minimal generating set for this group is {H, T, CNOT}.

2.2. Circuit-Polynomial Correspondence

The circuit-polynomial correspondence [Mon17] associates a phase polynomial and a linear Boolean transformation with every quantum circuit generated by the set {CNOT, H, T}. More precisely, Lemma 2.1. ([AMMR13]). A unitary $U \in U(2^n)$ is exactly implementable by an n-qubit circuit over {CNOT, T} if and only if $$U|x_1 x_2 \ldots \rangle = \omega^{p(x_1, x_2, \ldots, x_n)} |g(x_1, x_2, \ldots, x_n)\rangle$$

where $\omega = e^{i\pi/4}$, $x_1, x_2, \ldots, x_n \in F_2$ and $$p(x_1, x_2, \ldots, x_n) = \sum_{i=1}^{\ell} c_i \cdot f_i(x_1, x_2, \ldots, x_n)$$

for some linear reversible function $g: F_2^n \to F_2^n$ and linear Boolean functions $f_1, f_2, \ldots, f_\ell \in (F_2^n)^*$ with coefficients $c_1, c_2, \ldots, c_\ell \in Z_8$.

This is called the sum-over-paths form of a circuit [DHM+05, KPS17, Mon17] and the variables $x_1, x_2, \ldots, x_n$ are called the path variables. $p(x_1, x_2, \ldots, x_n)$ is referred to as the phase polynomial. Each $f_i(x_1, \ldots, x_n)$ is a parity term.

Thus one can fully characterize a unitary $U \in U(2^n)$ implemented by a {CNOT, T}-generated circuit with a set $P \subset Z_8 \times (F_2^n)^*$ of linear Boolean functions together with coefficients in Z8 and a linear reversible output function $g: F_2^n \to F_2^n$, with the interpretation $$U_{<S,g>}: |x_1 x_2 \ldots x_n\rangle \to \theta^{\Sigma(c,f) \in P^c \cdot f(x_1, x_2, \ldots, x_n)} |g(x_1, x_2, \ldots, x_n)\rangle$$

The set P (phase polynomial set) and g are efficiently computable given a circuit over {CNOT, T}, taking time linear in the number of qubits and gates.

The H gate is a "branching gate" and has the following effect on a basis state $x_1 \in F_2$.

$$H : |x_1\rangle \to \frac{1}{\sqrt{2}} \sum_{x_2 \in F_2} \omega^{4 \cdot x_1 \cdot x_2} |x_2\rangle$$

Here $x_1$ is the path variable and the variable $x_1$ ceases to exist after H is applied. Similar to Lemma 2.1 we can have the following result.

Lemma 2.2. ([AMM14]). If a unitary $U \in U(2^n)$ is exactly implementable by an n-qubit circuit over {CNOT, H, T} with k H gates, then for $x_1, x_2, \ldots, x_n \in F_2$, $$U|x_1 x_2 \ldots x_n\rangle = \frac{1}{\sqrt{2^k}} \sum_{x_{n+1} \ldots x_{n+k} \in F_2^k} |y_1 y_2 \ldots y_n\rangle$$

where $y_j = h_j(x_1, x_2, \ldots, x_{n+k})$ and $$p(x_1, x_2, \ldots, x_{n+k}) = \sum_{i=1}^{\ell} c_i \cdot f_i(x_1, \ldots, x_{n+k}) + 4 \cdot \sum_{i=1}^{\ell} x_{n+i} \cdot g_i(x_1, \ldots, x_{n+k})$$

for some linear Boolean functions $h_i, f_i, g_i$ and coefficients $c_i \in Z_8$. The k path variables $x_{n+1}, \ldots, x_{n+k}$ result from the application of Hadamard gates. But unlike Lemma 2.1 the converse is not true.

2.3. Steiner Tree

A graph is a pair $G=(V_G, E_G)$ where $V_G$ is a set of vertices and $E_G$ is a set of pairs $e=(u, v)$ such that $u, v \in V_G$. Each such pair is called an edge. One may define a function $w_{EG}: E_G \to \mathbb{R}$ that assigns a weight to each edge. If there are no such functions or $w_{EG}(e)=1$ for every $e \in E_G$ then we call it an unweighted graph. The graphs considered are simple (with at most one edge between two distinct vertices and no self-loops i.e. $(u, u) \notin E_G$), undirected (edges have no direction i.e. $(u, v)=(v, u)$) and unweighted. A graph $G'=(V_{G'}, E_{G'})$ is a subgraph of G such that $V_{G'} \subset V_G$ and $E_{G'} \subset EG$. A tree is an undirected graph in which any two vertices are connected by exactly one path, or equivalently a connected, acyclic, undirected graph.

Definition 2.1 (Steiner tree). Given a graph $G=(V_G, E_G)$ with a weight function $w_E$ and a set of vertices $S \subset V_G$, a Steiner tree $T=(V_T, E_T)$ is a minimum weight tree that is a subgraph of G such that $S \subset V_T$.

The set of vertices in S are called terminals while those in $V_T \setminus S$ are called Steiner nodes.

Computing Steiner trees is NP-hard and the related decision problem is NP-complete [Kar72]. There are a number of heuristic algorithms that compute approximate Stiener trees like in [RZ05, BGRS13], the latter gives a solution which is within a factor of 1.39 times the optimal. A survey about different Steiner tree approximation algorithms is given in [HR92]. The choice of algorithm is usually determined by the application, usually it is a trade-off between quality (approximation factor) and running time.

The heuristic algorithm we use is the one given by Wang [Wan85], which has similarity to Kruskal's minimum spanning tree algorithm [Kru56]. Similar to [SF13] one can incorporate optimization steps by Rayward et al.[RSC86]. This helps achieve a better running time compared to the best (with respect to quality) approximation algorithms in literature, without sacrificing the approximation factor much. The primary idea of the algorithm is to maintain a number of subgraphs and sequentially merge those which are closest to each other. The distance between two subgraphs $g_i$, $g_j$ is measured by the length of the shortest path between any two nodes u, v such that $u \in V_{gi} \setminus V_{gj}$ and $v \in V_{gj} \setminus V_{gi}$. When a subgraph has all terminals then we stop the merging and remove all non-terminal nodes of degree 1. A pseudocode of this algorithm has been given in Appendix A (FIG. 9—Algorithm 7).

The size of the constructed Steiner tree is at most $2(1-1/l)$, where l is the number of leaves in the minimal Steiner tree. The running time is $O|S|^2(|V_G|+|E_G|)$ [SF13].

3. Synthesis Algorithms with Connectivity Constraints

In this section first a synthesis algorithm is described that generates a circuit implementing a linear transformation using gates in the set $G_{lin}=\{CNOT, X\}$ (Section 3.1). Then an algorithm is described that synthesizes a circuit implementing a phase polynomial network using gates $G_{ph}$ generated by the set $\{CNOT, X, T\}$.

3.1. Synthesis of CNOT, X Circuits

Consider an n-qubit circuit built with gates in the set $G_{lin}=\{CNOT, X\}$. Represent the overall linear transformation by an n×n+1 "augmented" matrix $A=[A'_{n \times n}|b_{n \times 1}]$, whose rows represent or are indexed by qubits. If we label the initial states of the qubits by variables $x_1, \ldots, x_n$ then the first n columns represent these variables and the last column represent the variable b indicating bit flips. Each variable $x_1, \ldots, x_n$, b takes values from the set $\{0, 1\}$. The initial state of A is $[I_n|0_{n \times 1}]_{n \times n+1}$. This represents the initial state of all the qubits. When $CNOT_{i,j}$ is applied row j is added (mod 2) to row i (row j remains same). The parity at qubit i is $x_i \oplus x_j$. When an X gate is applied on qubit i then $A_{i,n+1} \leftarrow 1 \oplus A_{i,n+1}$.

Now suppose one is given a linear transformation $A=[A'_{n \times n}|b_{n \times 1}]$ of a circuit and it is desired to synthesize a circuit implementing this transformation. One can use the same reverse engineering idea of Patel, Markov and Hayes [PMH08]. The procedure is similar to Gaussian elimination. (a) First we make b=0 by flipping the entries with 1. This corresponds to applying X on the respective qubit. (b) Apply a series of elementary row operations (bit-wise addition) on A such that A' is in upper triangular form. Each row operation represents the application of a CNOT gate. (c) Then transpose the matrix and perform elementary row operations on $A^T$ such that A' is I. The output circuit is constructed as follows: first, the CNOT gates obtained in (c) with the control-target flipped but preserving the order, then the CNOT gates obtained in (b) with control-target preserved but reversing the order in which they were performed, and lastly the X gates obtained in (a).

To incorporate connectivity constraints, one can use Steiner trees as described in LINEAR-TF-SYNTH (FIG. 3—Algorithm 1). First make b=0 by placing X gates (step 2), as described before. Then, convert A' into an upper triangular form (step 8) by row-operations "permitted" by the input connectivity graph G. This is a graph whose vertices represent qubits and a two-qubit gate like CNOT can be placed only when there exists an edge between the corresponding vertices. For each column of A' (starting from the first one) compute a minimal Steiner tree approximation with (i) connectivity graph $G'=G \setminus I$ (excluding the vertices in I and the edges adjacent to these vertices) where I is the set of columns which have been operated on or which have been "fixed" to have 1 in the diagonal and 0 in the rest, and (ii) set of terminals S which are the rows below the diagonal and having a 1. Then invoke the procedure ROW-OP, as described in Algorithm 2 (FIG. 4).

The idea of ROW-OP is to use a set of operations such that 1 in the diagonal is "propagated" via intermediate Steiner nodes to cancel the 1 in the terminal nodes and then use another set of operations to cancel any 1 in the Steiner nodes. Assume the diagonal has 1, else it is adjusted by a set of operations to propagate a 1 to the diagonal node (step 4 of Algorithm 1—see FIG. 3). The diagonal node (let c) becomes the "pivot" node. The input Steiner tree approximation $T_{c,S}$ is separated into a set of edge-disjoint sub-trees (step 1 of Algorithm 2—see FIG. 4) by calling the procedure SEPARATE (FIG. 5—Algorithm 3).

The root and leaves in each sub-tree are terminal nodes (from S) and the rest are Steiner nodes. Then 1 from from root of each sub-tree cancels the 1 at leaves via operations performed in step 11,13 of Algorithm 2 and the 1s at Steiner nodes get cancelled by the operations performed in step 15, 17 of the same procedure. If in a sub-tree the root node is r and the leaves are $l_1, \ldots, l_m$ then the parity at the root node and each Steiner node remains unchanged but the parity at leaf $l_i$ become $x_{l_i} \oplus x_r (\oplus_{j \in P} x_j)$ where P is the set of Steiner nodes in the path from r to $l_i$. The resultant matrix A' is in upper triangular form.

Next, transpose A'. A goal is now to convert $(A')^T$ into upper triangular form without destroying the 0s in the upper-triangle. This in turn implies that for each non-diagonal node j one wants the parity to be $x_j' \oplus x_k'$, where k<j and $x_j'$, $x_k'$ are the parities at node j and k respectively before the transpose step 11 in Algorithm 1. Similarly as before, one can invoke the procedure ROW-OP (Algorithm 2) but this time include steps 6,8 and 20,22 in it, so that for each sub-tree constructed the parity at root r and Steiner nodes remain unchanged, but the parity at each leaf node l becomes $x_r' \oplus x_l'$. Now if r>l then we perform some correction procedures (step 21-29 in Algorithm 1). Note the parity at r is $x_{r_i}' \oplus x_r'$ where $r_i$ is the root of the sub-tree in which r was a leaf. Then if ROW-OP is invoked with the shortest path from r to l as a tree, then parity at l becomes $x_{r_i}' \oplus x_l'$. Every other parity remains unaffected. If $r_i$>l, then again invoke ROW-OP with the shortest path from $r_i$ to l as a tree. One can continue doing this until the parity at l is "corrected" i.e. it becomes $x_l' \oplus x_k'$ for some k<l. One can start these correction procedures from the first sub-tree, so as to guarantee that the parity at each node gets corrected as desired.

Remark 3.1. The use of Steiner trees to take care of connectivity constraints was also done in [NGM20] and [KdG19]. The present procedures are different from both. While calling the procedure ROW-OP during the reduction to upper-triangular form (before transpose in step 11 in Algorithm 1) some steps are skipped (steps 6,8 and 20,22 in Algorithm 2) because it was not necessary and this reduced the CNOT count. Traverse each Steiner tree twice, so the number of CNOT gates required is approximately 2e where e is the number of edges in the tree. In contrast the algorithm in [NGM20] in this phase consumes approximately 4e CNOT gates. After transposing in step 11 in Algorithm 1 the present procedure is markedly different from the approach taken in [NGM20]. Even the present "correction procedure" is different from the recursive approach taken in [KdG19] for general graphs. Asymptotically the complexity of LIN-EAR-TF-SYNTH is similar to the corresponding algorithms in [NGM20] and [KdG19]. There are n Steiner trees constructed for each of the n columns. Each Steiner tree approximation will always be of size $O(n)$. The number of CNOT gates applied is $O(n)$. So overall complexity is $O(n^2)$.

Section 3.2. Synthesis of Circuits Over $\{CNOT, X, T\}$

Next consider the circuits implemented with the set of gates $(G_{ph})$ generated by $\{CNOT, X, T\}$. Since $Ph=T^2$, $Z=T^4$, $T^\dagger=T^7$ and $Ph^\dagger=T^6$, so $Gph=\{CNOT, X, T, T^\dagger, Ph, Ph^\dagger, Y, Z\}$. We know from Lemma 2.1 in Section 2.2 that a unitary implemented over $\{CNOT, T\}$ can be characterized by a set $P=\{(c, f): c \in Z_8$ and $f \in (F_2^n)^*\}$ and linear reversible output functions $g: F_2^n \to F_2^n$ (Equation 6). This actually holds for circuits over $\{CNOT, X, T\}$.

Given an n-qubit circuit over $\{CNOT, X, T\}$ with input path variables $x1, x2, \ldots, xn$, one can compute each P as follows: For each gate $U \in \{T, T^\dagger, Ph, Ph^\dagger, Z, Y\}$ consider the parity, $\oplus_{j \in S} (xj \oplus b)$ for $S \subset [n]$, of the qubit just before U acts. Here $b \in \{0, 1\}$ is the bit variable that takes the value 1 only after an X or Y gate acts. This is represented by the function f. The coefficient c is given by $\{1, 7, 2, 6, 4, 4, 4\}$ respectively. For $(c_1, f_1), (c_2, f_2) \in P$ if $f_1=f_2=f$ then we can merge them into a single pair $(c_1+c_2 \mod 8, f)$.

The linear reversible output function is $g: F_2^n \times F_2 \to F_2^n \times F_2$ (one of the variables is the bit flip variable b). More detail about the matrix representing g and procedures to synthesize circuits over $\{CNOT, X\}$ that realize g has been given in Section 3.1.

One can follow the approach taken in [AAM18] and [NGM20] while re-synthesizing circuits over $\{CNOT, X, T\}$. Both these authors consider a restricted gate set consisting of CNOT and rotation gates Rz. Given a phase polynomial set P and matrix A corresponding to the linear reversible output function g, they first synthesized a parity network (defined below) that realizes the parity terms (f where $(c, f) \in P$) in P. Then they applied the rotation gates depending on the coefficients (c) in P. After that they synthesized a circuit such that the overall linear transformation is A. While the algorithm in [NGM20] takes care of connectivity constraints, the one in [AAM18] is oblivious to it.

Definition 3.1. (Parity network). A parity network for a set $P=\{(c, f): c \in Z_8$ and $f \in (F_2^n)^* \times F_2\}$ is an n-qubit circuit over $\{CNOT, X\}$ gates in which each parity term f such that $(c, f) \in P$ appears at least once.

Definition 3.2. (Phase polynomial network). A phase polynomial network for a set $P=\{(c, f): c \in Z_8$ and $f \in (F_2^n)^* \times F_2\}$ is an n-qubit circuit over $\{CNOT, X, T\}$ such that for each element $(c, f) \in P$ the parity f appears before a gate in $\{T, T^\dagger, Ph, Ph^\dagger, Z, Y\}$ when $c \in \{1, 7, 2, 6, 4, 4\}$ respectively.

Next, the algorithm PHASE-NW-SYNTH (Algorithm 4) is described, which synthesizes a phase polynomial network given by P. One can construct the parity network matrix P, which has n rows corresponding to each qubit and where each column corresponds to a parity term f in P. Similar to [AAM18], the optimization procedure to synthesize the parity network represented by P is inspired by Gray codes [Fra53], which cycle through the set of n-bit strings using the exact minimal number of bit flips. Given a set B of binary strings (step 4), synthesize a parity network for B by repeatedly choosing an index j (step 25) to expand and then effectively recurring on the co-factors $B_0$ and $B_1$ (step 26), consisting of the strings $p \in B$ with $p_j=0$ or 1 respectively. As a subset B is recursively expanded, CNOT gates are applied so that a designated target qubit i contains the partial parity $\oplus_{k \in S'} x_k$ where S' is the set of qubits (or row indices) such that $p_k=1$ ($k \neq i$) for all $p \in B$ (step 11). Whenever a column has a single 1, it implies that the corresponding parity has been realized. As such, one can remove these columns from the set B' of "remaining parities" (steps 19-22). At this step one can place the gate X if parity realized on circuit is $1 \oplus f$ for some $(c, f) \in P$. One can also place a gate in $\{T, T^\dagger, Ph, Ph^\dagger, Z, Y\}$ corresponding to the value of the coefficient c.

To incorporate connectivity constraints find a minimal Steiner tree $T_{I,S}$ with connectivity graph $G|_{I \cap (i)}$ (G restricted to the vertices in $I \cap \{i\}$ for some set I) and terminals $S=S' \cup \{i\}$ (step 14). This procedure is called ROW-OP (FIG. 4—Algorithm 2) with the matrix A such that its columns are the set of unrealized parities 15. ROW-OP calls the sub-routine SEPARATE (FIG. 5—Algorithm 3) which as before separates $T_{I,S}$ into edge-disjoint sub-trees such that in each tree the root and leaves belong to set of terminals S. However, unlike the previous methods, this time each sub-tree with multiple leaves are further sub-divided such that each tree has a single leaf. Each such tree is stored in reverse depth-first order such that the leaf becomes root and vice-versa (steps 9-11 in Algorithm 3). Now, when one performs steps 4-27 of Algorithm 2 then for each sub-tree the parity at root is $x_r \oplus x_l$ where r, l are the root and leaf of the sub-tree respectively (before flipping). Now, since the trees are processed from last sub-tree to first, the net parity at node (or qubit i) is $\oplus_{k \in S} x_k$. To maintain the invariant that the remaining parities are expressed over the current state of the qubits, one can modify the matrix A as given in step 26 of Algorithm 2.

Remark 3.2. In [NGM20] an algorithm to synthesize parity networks over $\{CNOT, R_z\}$ was described and a somewhat similar intuition was sketched in [KdG19]. Both used Steiner trees and the sum-over-path formulation of such circuits. However, here the way CNOT gates are assigned according to the constructed Steiner trees is markedly unique.

4. Synthesis of Circuits Over (CNOT, X, T, H) Gates

Finally in this section one is in a position to describe re-synthesis algorithms that takes as input a circuit $C_I$ over a universal fault-tolerant gate set Guniv=$\{CNOT, T, T^\dagger, Ph, Ph^\dagger, X, Y, Z, H\}$ and it outputs a circuit $C_O$ with gates in the same set, but the position of the CNOT gates are restricted by some connectivity constraints imposed by an input connectivity graph G.

The basic format of the re-synthesis algorithms include slicing the given circuit and building the sliced portions. Partition the given circuit at the position of the H gates and then sequentially re-synthesize sub-circuits in each portion such that the transformation within each portion and the overall circuit transformation remains unchanged. Two methods of slicing have been investigated—the first one is a simple slice-and-build and the second one is motivated by the Tpar algorithm given in [AMM14].

4.1. Simply Slice-and-Build: First Divide and then Generate

In the first algorithm CNOT-OPT-A (FIG. 7—Algorithm 5) first partition the given circuit at the position of H gates.

Within each partition initialize the state of the qubits Q by the path variables $(x_1, x_2, \ldots, x_n)$ and the phase polynomial set P as empty set (step 3). Then with the application of each gate $U_i \in G_{univ}$ or $U_{(ij)} \in G_{univ}$, update Q and P (step 4-step 6) by the function $\tilde{U}_i$: $<P,Q> \to <P,Q>$ as follows.

$\tilde{X}_L<P,Q>=<P,(q_1,\ldots,q_{i-1},1 \otimes q_i, \ldots, q_n)>;$ $\widetilde{CNOT}_{(i,j)}<P,Q>=<P,(q_1,\ldots,q_{j-1},q_i \otimes q_j, \ldots q_n)>;$ $\tilde{Ph}<P,Q>=<P \cap (2,q_i),Q>; \tilde{Ph}_i^\dagger<P,Q>=<P \cap (6,q_i),Q>;$ $\tilde{T}_i<P,Q>=<P \cap (1,q_i),Q>; \tilde{T}_i^\dagger<P,Q>=<P \cap (7,q_i),Q>;$ $\tilde{Z}_i<P,Q>=<P \cap (4,q_i),Q>;$ $\tilde{Y}_i<P,Q>=<P \cap (4,q_i),(q_i,\ldots,q_{i-1},1 \otimes q_i,\ldots,q_n)>;$ In the above set of equations, for two sets P' and P'', $P' \cup P'' = \{(c,f):(c_1,f) \in P', (c_2,f) \in P'', c=c_1+c_2 \bmod 8\}$.

Then, synthesize the phase polynomial network ($C_{ph}$) for P (step 9) by invoking the procedure PHASE-NW-SYNTH (FIG. 6—Algorithm 4). Calculate the linear transformation A (step 11) mapping $Q_{ph}$ (state of the qubits after $C_{ph}$) to Q, which after steps 4-6 stores the state of the qubits at the end of the present slice. Synthesize the circuit $C_{lin}$ for A (step 12) using the procedure LINEAR-TF-SYNTH (Algorithm 1). Append the gates from $C_{ph}$, $C_{lin}$ followed by the H gate (step 13). Then, repeat the same steps for the next slice (till the next H gate or the end of the given circuit).

Remark 4.1. The intuition behind this kind of slice-and-build is as follows. Suppose number of CNOT in the given circuit is $N_i$ and using SWAP-template the number of CNOTs obtained is $N_{iswap}$. Now between two H gates (including the portion before the first and after the last H gate) there is a phase polynomial network. If one applied the algorithm of [AAM18] then one can expect to get reduction in CNOT count for a phase polynomial network. This reduces the overall CNOT count from $N_i$ to $N_2$. If one applies SWAP-template to this circuit it will give a CNOT count $N_{2swap}$ and we can expect $N_{2swap} < N_{iswap}$. Now in our connectivity-constraint-aware algorithm in each phase polynomial network the CNOTs are placed using Steiner trees which basically has the effect of minimizing the total length of path between the control and target of the CNOT gates. Thus, one can expect to get a CNOT count $N_O < N_{2swap} < N_{iswap}$.

4.2. A Second Type of Slice-and-Build: First Generate and then Divide

In this section another way of slicing the given circuit is provided, as described in procedure CNOT-OPT-B.(FIG. 8—Algorithm 6). Unlike CNOT-OPT-A, here one first computes some necessary information about the whole circuit and then between two H gates attempt to synthesize a circuit that computes part of the information. Similar to CNOT-OPT-A the transformations between two H gates as well as the overall transformation remain unchanged. That is, given $C_I$, first compute a triple D=$<P, Q, \mathcal{H}>$, where P is the phase polynomial set, Q=$(q_1, q_2, \ldots, q_n)$ represents the state of each qubit given as a function of the path variables and the bit flip variable $b \in \{0, 1\}$, and H is an array of structures where the $i^{th}$ structure stores the state of the qubits before and after the application of the $i^{th}$ H gate. The initial state of the qubits is Q=$(x_1, x_2, \ldots, x_n)$ (i.e. $q_i = x_i \forall i$). Both P and $\mathcal{H}$ are initialized as empty sets. With the application of each gate $U_i \in G_{univ}$ or $U_{(i,j)} \in G_{univ}$ (subscripts denote the qubit on which the gate acts) the triple D gets updated by a function $\overline{U}_i : D \to D$. Except for H gate this function is similar to function $\tilde{U}_i$ defined in Section 4.1. The array $\mathcal{H}$ remains unchanged after the application of $\overline{U}_i$ for each gate except H. For H gate the function is defined as follows.

$\overline{H}_i<P, Q, H>=<P, Q', H'>$ where Q=$(q_i, \ldots, q_{i-1}, x_{n+j+1}, \ldots, q_n)$ and H'=$H \cup \{h_{j+1}\}$ such that $h_{j+1}.Pos=i$, $h_{j+1}.Q_I=Q$, $h_{j+1}.Q_O=Q'$ (here |H|=j)

New path variables are introduced after application of each H gate. One actually slices the sets P, Q and $\mathcal{H}$ according to some conditions and synthesizes circuits according to these slices. For each $h \in \mathcal{H}$ calculate the set $P'=\{(c, f) \in \dotplus P : f \in \text{span}(h \cdot Q_I) \text{ but } f \notin \text{span}(h \cdot Q_O)\} \subset P$ of parity terms that become incomputable after placement of H at qubit h·Pos (step 6 in Algorithm 6). One can express these parities in the basis given by the state of the qubits at the beginning of the current time slice, which is $Q_{init} = (x_1, \ldots, x_n)$ if h is the first Hadamard gate, else it is $h' \cdot Q_O$, the state of the qubits after the previous H gate (step 9). One can then calculate the phase polynomial network ($C_{ph}$) for the set $P_{Qinit}$ (P' in the new basis i.e. parity terms in P' as function of $Q_{init}$) by invoking the procedure PHASE-NW-SYNTH (Algorithm 4). Let $Q_{ph}$ is the state of the qubits after $C_{ph}$ and A is the linear transformation mapping $Q_{ph}$ to $h \cdot Q_I$. To realize this transformation in this portion of the circuit we call the procedure LINEAR-TF-SYNTH (Algorithm 1). Append ($C_{ph}, C_{lin}, H[k]$) to the set of circuit gates, where $C_{lin}$ is the circuit returned by LINEAR-TF-SYNTH and k=h·Pos.

After processing all the partitions until the last Hadamard gate one can ensure that the complete phase polynomial set P has been synthesized and the overall linear transformation of the output circuit maps $(x_1, x_2, \ldots, x_n)$ to $Q_{out}$, the final output of the circuit (which was calculated at the beginning while calculating D). For this, first synthesize the phase polynomial network $C_{ph}$ of any residual parity terms (step 21 in Algorithm 6). Then, calculate the residual transformation A (step 26) that maps $Q_{ph}$, state of the qubits after $C_{ph}$, to $Q_{out}$. And, synthesize the circuit Cr, (step 27) for A.

4.3. Implementation and Results

The connectivity constraints have been considered, imposed by some popular architecture like 9-qubit square grid (FIG. 1), 16-qubit square grid, Rigetti 16-qubit Aspen, 16-qubit IBM QX5, 20-qubit IBM Tokyo (FIG. 2). This has included working with some benchmark circuits (Table 2) and some randomly generated circuits on 9, 16 and 20 qubits (FIG. 1). The 9-qubit random input circuits have CNOT-count 3, 5, 10, 20 or 30, while both the 16 and 20-qubit random input circuits have CNOT-count 4, 8, 16, 32, 64, 128 or 256. For each of these groups 10 random circuits were generated. The CNOT-count overhead obtained by using SWAP-template (FIG. 1) has been compared with the CNOT-count obtained from procedures CNOT-OPT-A (FIG. 7—Algorithm 5) and CNOTOPT-B (FIG. 8—Algorithm 6). By overhead it is meant the percentage increase in CNOT-count after taking into consideration connectivity constraints. The results for benchmark circuits and the random circuits have been tabulated in Tables 2 and 1 respectively. All the simulations have been done in Java on a 3.1 GHz Dual-Core Intel Core i7 machine with 8 GB RAM and running MacOS Catalina 10.15.2. It has been found that both algorithms perform quite well in the case of benchmark circuits. CNOT-OPT-A performs much better than the other algorithms in the case of random circuits.

TABLE 1

Performance of CNOT-OPT-A and CNOT-OPT-B for random circuits. The overhead or increase in CNOT-count has been compared to the overhead obtained by using SWAP-template.

| Architecture | #Qubits | Initial count | SWAP-template Count | CNOT-OPT-A Count | CNOT-OPT-A Time | CNOT-OPT-B Count | CNOT-OPT-B Time |
|---|---|---|---|---|---|---|---|
| 9q-square | 9 | 3 | 560% | 0.00% | 0.184 s | 343% | 0.105 s |
| | | 5 | 612% | 146% | 0.146 s | 400% | 0.128 s |
| | | 10 | 594% | 105% | 0.167 s | 426% | 0.119 s |
| | | 20 | 546% | 176% | 0.2 s | 488% | 0.158 s |
| | | 30 | 596% | 184.67% | 0.233 s | 649% | 0.185 s |
| 16q-square | 16 | 4 | 1050% | 238% | 0.23 s | 768% | 0.12 s |
| | | 8 | 840% | 146.25% | 0.27 s | 660% | 0.137 s |
| | | 16 | 817.50% | 158.13% | 0.43 s | 864% | 0.225 s |
| | | 32 | 853% | 340.63% | 0.41 s | 1213% | 0.29 s |
| | | 64 | 892.50% | 220.78% | 0.49 s | 1259% | 0.65 s |
| | | 128 | 858.75% | 210.63% | 0.57 s | 1156% | 1.144 s |
| | | 256 | 897.42% | 237.5% | 0.72 s | 1306% | 1.85 s |
| rigetti-16q-aspen | 16 | 4 | 1680% | 355% | 0.23 s | 1278% | 0.115 s |
| | | 8 | 1740% | 253% | 0.396 s | 1313% | 0.135 s |
| | | 16 | 1619.90% | 351% | 0.47 s | 1304% | 0.162 s |
| | | 32 | 1794% | 469.48% | 0.48 s | 1852% | 0.375 s |
| | | 64 | 1755% | 399% | 0.66 s | 1900% | 0.71 s |
| | | 128 | 1760.63% | 368.13% | 0.58 s | 1953% | 1.37 s |
| | | 256 | 1757.11% | 410.9% | 0.61 s | 1982% | 1.68 s |
| ibm-qx5 | 16 | 4 | 1260% | 173% | 0.38 s | 988% | 0.108 s |
| | | 8 | 1035% | 295% | 0.36 s | 1065% | 0.126 s |
| | | 16 | 1042.50% | 283% | 0.41 s | 1226% | 0.47 s |
| | | 32 | 1179.38% | 398.44% | 0.42 s | 1677% | 0.68 s |
| | | 64 | 1130.63% | 339.06% | 0.45 s | 1733% | 0.7 s |
| | | 128 | 1110.94% | 344.69% | 0.575 s | 1675% | 1.15 s |
| | | 256 | 1141.17% | 379.88% | 0.73 s | 1792% | 1.58 s |
| ibm-q20-tokyo | 20 | 4 | 525% | 128% | 0.186 s | 418% | 0.4 s |
| | | 8 | 555% | 275% | 0.295 s | 690% | 0.37 s |
| | | 16 | 570% | 88% | 0.37 s | 663% | 0.41 s |
| | | 32 | 500.63% | 154.38% | 0.55 s | 972% | 0.8 s |
| | | 64 | 542.81% | 136.88% | 0.54 s | 1084% | 0.82 s |
| | | 128 | 539.53% | 141.02% | 0.645 s | 1028% | 1.29 s |
| | | 256 | 534.61% | 125.27% | 0.72 s | 1030% | 2.085 s |

TABLE 2

Performance of CNOT-OPT-A and CNOT-OPT-B for benchmark circuits. The overhead or increase in CNOT-count has been compared to the overhead obtained by using SWAP-template.

| Architecture | #Qubits | Benchmark | SWAP-template Count | CNOT-OPT-A Count | CNOT-OPT-A Time | CNOT-OPT-B Count | CNOT-OPT-B Time |
|---|---|---|---|---|---|---|---|
| 9q-square | 9 | barenco-tof-5 | 457.14% | 245.24% | 0.365 s | 140.48% | 0.52 s |
| | | grover-5 | 685.71% | 116.67% | 0.502 s | 105.36% | 0.84 s |
| | | mod-mult-55 | 752.73% | 321.82% | 0.31 s | 203.64% | 0.26 s |
| | | tof-5 | 465.31% | 140.82% | 0.27 s | 138.78% | 0.24 s |
| 16q-square | 16 | hwb10 | 977.95% | −63% | 8.77 s | −57.67% | 7.25 s |
| rigetti-16q-aspen | 16 | | 1508.63% | −36.13% | 8.8 s | −34.29% | 6.64 s |
| ibm-qx5 | 16 | | 1099.84% | −54.32% | 6.18 s | −50.75% | 8.61 s |
| ibm-q20-tokyo | 20 | ham15-high | 571.44% | −52.52% | 0.72 s | −63.21% | 0.66 s |
| | | hwh12 | 619.42% | −77.58% | 177.23 s | −74.92% | 231.14 s |

5. Conclusion

While implementing a quantum algorithm on an actual hardware, one needs to keep in mind the different constraints imposed by the underlying architecture. One such constraint is the connectivity constraint, which is more concerning for multi-qubit gates like CNOT. In a universal fault-tolerant gate set like CNOT+T, though the T-gate is the most costly to implement fault-tolerantly, the CNOT-count is also important specially in the NISQ era. One of the popular approaches have been to use SWAP gates to place the logical qubits at suitable positions (until now mostly nearest neighbor) and then apply the CNOT operation. Each SWAP operation can be performed by 3 CNOT gates. This solution considers the problem of re-synthesizing Clifford+T circuits with reduced CNOT-count compared to the SWAP-template, while respecting the connectivity constraint.

Broadly recourse can be taken to a slice-and-build approach, where one can slice or partition the input circuit and re-synthesize the slices with algorithms that use Steiner trees to place the CNOT gates. Two methods of slicing have been evaluated. In the simpler way, the input circuit is sliced at the positions of the H gates and then re-synthesize the intermediate circuit (which does not contain H gate) with Steiner trees. In another way of slicing, the phase polynomial of the whole input circuit is calculated and this polynomial sliced. A circuit for the terms is synthesized that is computable in each slice. This was appended by a circuit to maintain the linear transformation of each slice invariant.

Some benchmarks have been simulated as well as some random circuits on popular architectures 9-qubit square grid, 16-qubit square grid, Rigetti 16-qubit Aspen, 16-qubit IBM QX5, 20-qubit IBM Tokyo. Our results show that for both benchmark and random circuits the simpler way of slicing the circuit (and not the phase polynomial) results in much less overhead in terms of increase in CNOT count, compared to the overhead obtained by using SWAP-template. The second method of slicing the phase polynomial gives much less overhead compared to SWAP-template in case of benchmark circuits, although less so for random circuits. Comparing both the slicing methods, the simpler method performs much better in nearly all cases Appendix A. Steiner Tree Algorithm In this section a heuristic approximation algorithm is described (see also FIG. 9) to find a minimal Steiner tree [SF13]. It starts by considering each terminal as a separate graph (step 1). Then sequentially one can merge the sub-graphs that are closest to each other (step 3-7). The distance between two graphs $f_i$ and $f_j$ is measured by the shortest distance between any pair of nodes $u_i$, $u_j$ such that $u_i \in f_i$ and $u_j \in f_j$ (step 4). If we have a sub-graph $f_i$ having all the terminal nodes then we construct a minimum spanning tree (step 9) T on $f_i$ and remove all non-terminal nodes of degree 1 (step 10). The resultant tree is returned as a minimum Steiner tree.

Quantum Computing System

Figure 10:
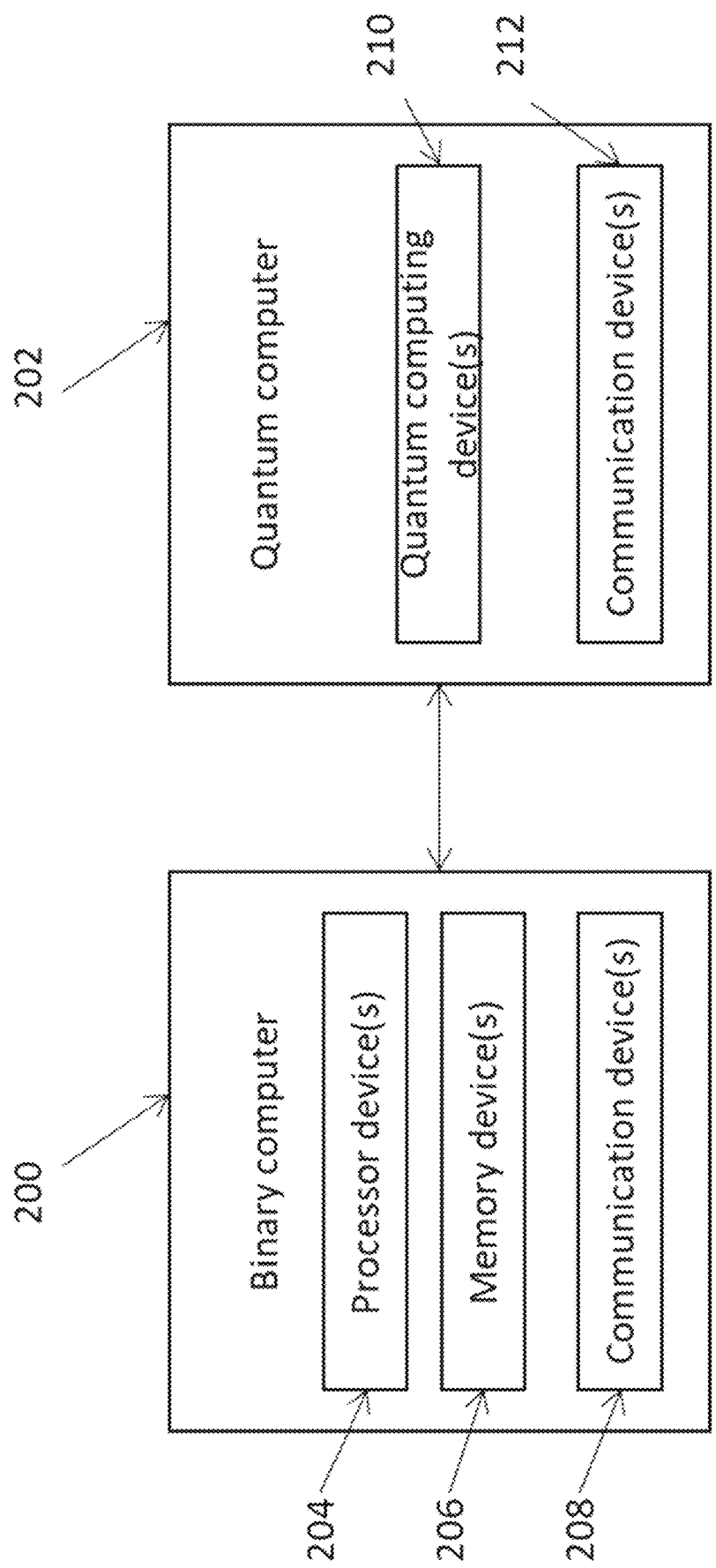
FIG. 10 is a schematic diagram of a binary computer and a quantum computer.

In an example embodiment shown in FIG. 10, a system includes a binary computer 200 that is in data communication with a quantum computer 202. The binary computer includes one or more processor devices 204, one or memory devices 206 and one or more communication devices 208. The processor 204 and the memory 206 include currently known and future known digital technologies. The quantum computer 202 includes one or more quantum computing devices 210 and one or more communication devices 212. In an example embodiment, the physical implementation of the quantum computing device is reconfigurable to generate different quantum circuits. It will be appreciated that currently and future known quantum computing devices that can implement different quantum circuits are applicable to the principles described herein.

Using the system of FIG. 10, a binary input representing an initial quantum circuit is received by the binary computer 200 and is stored in memory 206. By performing the computations on the binary computer via the processor(s) 204 according to the methods described herein, the binary computer is able to generate and output a binary file that represents a new quantum circuit that has a lower circuit cost, e.g., in terms of T-count and/or T-depth, compared to the initial quantum circuit, but still has the same function. This binary file representing the new quantum circuit is transmitted to the quantum computer 202. The quantum computer 202 then uses the received binary file to adjust the parameters of the quantum computing devices to perform the new quantum circuit. In other words, the quantum computer executes physical CNOT and Rz transformations in accordance with the binary form of the new quantum circuit.

It should be noted that, while some of the methods and systems disclosed have been described in the abstract language of mathematics, the current application is directed towards the production of tangible, physical representations of efficient quantum circuits. For example, in one embodiment of the methods disclosed, the optimization procedures are performed by a computer program designed to be run on a conventional computer. The input and output are circuits stored in an appropriate binary format in the physical memory—for example, a magnetic-disk (hard disk)—of the computer. Such a physical representation of a quantum circuit in an electronic storage medium may then later be used to implement the operation with a particular quantum computing technology. Examples of applicable quantum computing technology include a classical simulator for quantum computing technology or a hybrid classical/quantum devices. For example, the digital representation of the optimized circuit as a sequence of CNOT, T, P, and Z gates may be used to determine a sequence of physical pulses needed to perform the operation on a quantum computer using topological quantum error correcting codes running on superconducting qubits. Alternatively, the operations may be performed by a series of pulses and other physical operations on a quantum computer consisting of trapped ions, or spin qubits in silicon, or nitrogen vacancy qubits in diamond, or qubits encoded in topologically ordered states of matter, or other realizations and variations, including hybrid devices.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of a classical (binary 200) or quantum (202) computer and/or simulation or execution module used herein, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[AAM18] Matthew Amy, Parsiad Azimzadeh, and Michele Mosca. On the controlled-not complexity of controlled-not-phase circuits. Quantum Science and Technology, 4(1):015002, 2018.

[AG04] Scott Aaronson and Daniel Gottesman. Improved simulation of stabilizer circuits. Physical Review A, 70(5):052328, 2004.

[AMM14] Matthew Amy, Dmitri Maslov, and Michele Mosca. Polynomial-time t-depth optimization of clifford+t circuits via matroid partitioning. IEEE Transactions on Computer-Aided Design of Integrated Circuits and Systems, 33(10):1476-1489, 2014.

[AMMR13] Matthew Amy, Dmitri Maslov, Michele Mosca, and Martin Roetteler. A meet-in-the-middle algorithm for fast synthesis of depth-optimal quantum circuits. IEEE Transactions on Computer-Aided Design of Integrated Circuits and Systems, 32(6):818-830, 2013.

[BC17] Debjyoti Bhattacharjee and Anupam Chattopadhyay. Depth-optimal quantum circuit placement for arbitrary topologies. arXiv preprint arXiv:1703.08540, 2017.

[BGRS13] Jaroslaw Byrka, Fabrizio Grandoni, Thomas Rothvoss, and Laura Sanita. Steiner tree approximation via iterative randomized rounding. Journal of the ACM (JACM), 60(1):1-33, 2013.

[BHL+16] CJ Ballance, TP Harty, N M Linke, MA Sepiol, and DM Lucas. High-fidelity quantum logic gates using trapped-ion hyperfine qubits. Physical review letters, 117 (6):060504, 2016.

[Bri17] Stephen Brierley. Efficient implementation of quantum circuits with limited qubit interactions. Quantum Information & Computation, 17(13-14):1096-1104, 2017.

[BSK+12] Joseph W Britton, Brian C Sawyer, Adam C Keith, C-C Joseph Wang, James Freericks, Hermann Uys, Michael J Biercuk, and John J Bollinger. Engineered twodimensional using interactions in a trapped-ion quantum simulator with hundreds of spins. Nature, 484(7395): 489, 2012.

[CDD+19] Alexander Cowtan, Silas Dilkes, Ross Duncan, Alexandre Krajenbrink, Will Simmons, and Seyon Sivarajah. On the qubit routing problem. arXiv preprint arXiv:1902.08091, 2019.

[CSKC11] Amlan Chakrabarti, Susmita Sur-Kolay, and Ayan Chaudhury. Linear neighbor synthesis of reversible circuits by graph partitioning. arXiv:1112.0564, 2011.

[dBBV+20] Timothée Goubault de Brugiére, Marc Baboulin, Benoit Valiron, Simon Martiel, and Cyril Allouche. Quantum cnot circuits synthesis for nisq architectures using the syndrome decoding problem. In International Conference on Reversible Computation, pages 189-205. Springer, 2020.

[DHM+05] Christopher M Dawson, Andrew P Hines, Duncan Mortimer, Heny L Haselgrove, Michael A Nielsen, and Tobias J Osborne. Quantum computing and polynomial equations over the finite field z2. Quantum Information & Computation, 5(2):102-112, 2005.

[FA18] Davide Ferrari and Michele Amoretti. Demonstration of envariance and parity learning on the ibm 16 qubit processor. arXiv preprint arXiv:1801.02363, 2018.

[Fey82] Richard P Feynman. Simulating physics with computers. Int. J. Theor. Phys, 21(6/7), 1982.

[Fra53] Gray Frank. Pulse code communication, Mar. 17, 1953. U.S. Pat. No. 2,632,058.

[Got98] Daniel Gottesman. The heisenberg representation of quantum computers. ArXiv preprint quant-ph/9807006, 1998.

[GTL+16] John P Gaebler, Ting Rei Tan, Y Lin, Y Wan, R Bowler, Adam C Keith, S Glancy, K Coakley, E Knill, D Leibfried, et al. High-fidelity universal gate set for be 9+ ion qubits. Physical review letters, 117(6):060505, 2016.

[HNYN11] Yuichi Hirata, Masaki Nakanishi, Shigeru Yamashita, and Yasuhiko Nakashima. An efficient conversion of quantum circuits to a linear nearest neighbor architecture. Quantum Information and Computation, 11(1):142, 2011.

[HOS+06] WK Hensinger, S Olmschenk, D Stick, D Hucul, M Yeo, M Acton, L Deslauriers, C Monroe, and J Rabchuk. T-junction ion trap array for two-dimensional ion shuttling, storage, and manipulation. Applied Physics Letters, 88(3):034101, 2006.

[HR92] Frank K Hwang and Dana S Richards. Steiner tree problems. Networks, 22(1):55-89, 1992.

[IKY02] Kazuo Iwama, Yahiko Kambayashi, and Shigeru Yamashita. Transformation rules for designing cnot-based quantum circuits. In Proceedings of the 39th annual Design Automation Conference, pages 419-424, 2002.

[IRI+19] Toshinari Itoko, Rudy Raymond, Takashi Imamichi, Atsushi Matsuo, and Andrew W Cross. Quantum circuit compilers using gate commutation rules. In Proceedings of the 24th Asia and South Pacific Design Automation Conference, pages 191-196, 2019.

[IRIM20] Toshinari Itoko, Rudy Raymond, Takashi Imamichi, and Atsushi Matsuo. Optimization of quantum circuit mapping using gate transformation and commutation. Integration, 70:43-50, 2020.

[Kar72] Richard M Karp. Reducibility among combinatorial problems. In Complexity of computer computations, pages 85-103. Springer, 1972.

[KdG19] Aleks Kissinger and Arianne Meijer-van de Griend. Cnot circuit extraction for topologically-constrained quantum memories. arXiv preprint arXiv: 1904.00633, 2019.

[KPS17] Dax E Koh, Mark D Penney, and Robert W Spekkens. Computing quopit clifford circuit amplitudes by the sum-over-paths technique. Quantum Information & Computation, 17(13-14):1081-1095, 2017.

[Kru56] Joseph B Kruskal. On the shortest spanning subtree of a graph and the traveling salesman problem. Proceedings of the American Mathematical society, 7(1):48-50, 1956.

[LDX19] Gushu Li, Yufei Ding, and Yuan Xie. Tackling the qubit mapping problem for nisq era quantum devices. In Proceedings of the Twenty-Fourth International Conference on Architectural Support for Programming Languages and Operating Systems, pages 1001-1014, 2019.

[LWD15] Aaron Lye, Robert Wille, and Rolf Drechsler. Determining the minimal number of swap gates for multidimensional nearest neighbor quantum circuits. In The 20th Asia and South Pacific Design Automation Conference, pages 178-183. IEEE, 2015.

[MBJA+19] Prakash Murali, Jonathan M Baker, Ali Javadi-Abhari, Frederic T Chong, and Margaret Martonosi. Noise-adaptive compiler mappings for noisy intermediate-scale quantum computers. In Proceedings of the Twenty-Fourth International Conference on Architectural Support for Programming Languages and Operating Systems, pages 1015-1029, 2019.

[MJACM19] Prakash Murali, Ali Javadi-Abhari, Frederic T Chong, and Margaret Martonosi. Formal constraint-based compilation for noisy intermediate-scale quantum systems. Microprocessors and Microsystems, 66:102-112, 2019.

[Mon17] Ashley Montanaro. Quantum circuits and low-degree polynomials over. Journal of Physics A: Mathematical and Theoretical, 50(8):084002, 2017.

[MY11] Atsushi Matsuo and Shigeru Yamashita. Changing the gate order for optimal Inn conversion. In International Workshop on Reversible Computation, pages 89-101. Springer, 2011.

[NGM20] Beatrice Nash, Vlad Gheorghiu, and Michele Mosca. Quantum circuit optimizations for nisq architectures. Quantum Science and Technology, 5(2):025010, 2020.

[O'D14] Ryan O'Donnell. Analysis of boolean functions. Cambridge University Press, 2014.

[Pal19] Alexandru Paler. On the influence of initial qubit placement during nisq circuit compilation. In International Workshop on Quantum Technology and Optimization Problems, pages 207-217. Springer, 2019.

[PMH08] Ketan N Patel, Igor L Markov, and John P Hayes. Optimal synthesis of linear reversible circuits. Quantum Information & Computation, 8(3):282-294, 2008.

[Pre18] John Preskill. Quantum computing in the nisq era and beyond. Quantum, 2:79, 2018.

[PS16] Massoud Pedram and Alireza Shafaei. Layout optimization for quantum circuits with linear nearest neighbor architectures. IEEE Circuits and Systems Magazine, 16(2):62-74, 2016.

[PZW18] Alexandru Paler, Alwin Zulehner, and Robert Wille. Nisq circuit compilers: search space structure and heuristics. arXiv preprint arXiv:1806.07241, 2018.

[RB17] Daniel Ruffinelli and Benjamin Baren. Linear nearest neighbor optimization in quantum circuits: a multiobjective perspective. Quantum Information Processing, 16(9):220, 2017.

[RD15] Md Mazder Rahman and Gerhard W Dueck. Synthesis of linear nearest neighbor quantum circuits. arXiv preprint arXiv:1508.05430, 2015.

[ROT+18] Matthew Reagor, Christopher B Osborn, Nikolas Tezak, Alexa Staley, Guenevere Prawiroatmodjo, Michael Scheer, Nasser Alidoust, Eyob A Sete, Nicolas Didier, Marcus P da Silva, et al. Demonstration of universal parametric entangling gates on a multi-qubit lattice. Science advances, 4(2):eaao3603, 2018.

[RSC86] Victor J Rayward-Smith and A Clare. 16(3):283-294, 1986.

[RZ05] Gabriel Robins and Alexander Zelikovsky. Tighter bounds for graph steiner tree approximation. SIAM Journal on Discrete Mathematics, 19(1):122-134, 2005.

[SF13] Afshin Sadeghi and Holger Fröhlich. Steiner tree methods for optimal sub-network identification: an empirical.study. BMC bioinformatics, 14(1):144, 2013.

[Sho99] Peter W Shor. Polynomial-time algorithms for prime factorization and discrete logarithms on a quantum computer. SIAM review, 41(2):303-332, 1999.

[SM09] Vivek V Shende and Igor L Markov. On the cnot-cost of toffoli gates. Quantum Information & Computation, 9(5):461-486, 2009.

[SPMH02] Vivek V Shende, Aditya K Prasad, Igor L Markov, and John P Hayes. Reversible logic circuit synthesis. In Proceedings of the 2002 IEEE/ACM international conference on Computer-aided design, pages 353-360, 2002.

[SSCP18] Marcos Yukio Siraichi, Vinicius Fernandes dos Santos, Sylvain Collange, and Fernando Magno Quintao Pereira. Qubit allocation. In Proceedings of the 2018 International Symposium on Code Generation and Optimization, pages 113-125, 2018.

[SSP13] Alireza Shafaei, Mehdi Saeedi, and Massoud Pedram. Optimization of quantum circuits for interaction distance in linear nearest neighbor architectures. In 2013 50th ACM/EDAC/IEEE Design Automation Conference (DAC), pages 1-6. IEEE, 2013.

[SSP14] Alireza Shafaei, Mehdi Saeedi, and Massoud Pedram. Qubit placement to minimize communication overhead in 2d quantum architectures. In 2014 19th Asia and South Pacific Design Automation Conference (ASP-DAC), pages 495-500. IEEE, 2014.

[SWD11] Mehdi Saeedi, Robert Wille, and Rolf Drechsler. Synthesis of quantum circuits for linear nearest neighbor architectures. Quantum Information Processing, 10(3):355-377, 2011.

[VDRF18] Davide Venturelli, Minh Do, Eleanor Rieffel, and Jeremy Frank. Compiling quantum circuits to realistic hardware architectures using temporal planners. Quantum Science and Technology, 3(2):025004, 2018.

[VPK+17] Richard Versluis, Stefano Poletto, Nader Khammassi, Brian Tarasinski, Nadia Haider, David J Michalak, Alessandro Bruno, Koen Bertels, and Leonardo DiCarlo. Scalable quantum circuit and control for a superconducting surface code. Physical Review Applied, 8(3):034021, 2017.

[Wan85] SM Wang. A multiple source algorithm for suboptimum steiner trees in graphs. In Proc. International Workshop on Graphtheoretic Concepts in Computer Science (H. Noltemeier, ed.), Trauner, W urzburg, pages 387-396, 1985.

[WBZ19] Robert Wille, Lukas Burgholzer, and Alwin Zulehner. Mapping quantum circuits to ibm qx architectures using the minimal number of swap and h operations. In 2019 56th ACM/IEEE Design Automation Conference (DAC), pages 1-6. IEEE, 2019.

[WGMAG14] Jonathan Welch, Daniel Greenbaum, Sarah Mostame, and Alsn Aspuru-Guzik. Efficient quantum circuits for diagonal unitaries without ancillas. New Journal of Physics, 16(3):033040, 2014.

[WKW+16] Robert Wille, Oliver Keszocze, Marcel Walter, Patrick Rohrs, Anupam Chattopadhyay, and Rolf Drechsler. Look-ahead schemes for nearest neighbor optimization of 1d and 2d quantum circuits. In 2016 21st Asia and South Pacific design automation conference (ASP-DAC), pages 292-297. IEEE, 2016.

[ZPW18] Alwin Zulehner, Alexandru Paler, and Robert Wille. An efficient methodology for mapping quantum circuits to the ibm qx architectures. IEEE Transactions on Computer-Aided Design of Integrated Circuits and Systems, 38(7):1226-1236, 2018.

The invention claimed is:

1. A method of partitioning gates of circuits based on the locality of H gates in the circuits, comprising:
partitioning gates of an input circuit according to positions of H gates in the input circuit to obtain a plurality of partitioned circuits;
generating a phase polynomial of each of the partitioned circuits; and
reconstructing an output circuit from the partitioned circuits for which phase Polynomials have been generated, while maintaining connectivity constraints.

2. The method of claim 1, wherein a linear transformation is determined for each of the partitioned circuits.

3. The method of claim 2, further comprising determining that an overall linear transformation of the output circuit maps to a final output.

4. The method of claim 1, further comprising applying a series of transformations such that each parity term occurs at least once in the output circuit.

5. The method of claim 4, wherein the series of transformations comprise CNOT gates.

6. The method of claim 1, further comprising imposing connectivity constraints by constructing Steiner trees with terminals being a set of qubits or vertices satisfying certain conditions.

7. The method of claim 1, further comprising determining edge information and performing a series of CNOT operations to get a desired result according to the edge information.

8. The method of claim 1, wherein a set of gates that is partitioned corresponds to the phase polynomial of the entire circuit.

9. The method of claim 8, wherein between two H gates a phase polynomial network circuit is synthesized using gates in the circuit that realize a partial phase polynomial, including terms in the polynomial network that become incomputable after the H gate being placed at an end of the current slice.

10. The method of claim 1, comprising synthesizing CNOT+Rz circuits using Steiner trees by:
computing a Steiner tree according to Steiner rows and terminal rows;
for each root to leaf path, flipping the role of the root and leaf, such that parity gets accumulated at the root; and
adding up the parities to obtain a desired parity, wherein a matrix is changed according to the unflipped leaf and root to reflect changes due to position of CNOT gates.

11. The method of claim 1, wherein while synthesizing CNOT+X circuits:
(a) reducing to upper triangle, wherein at least one CNOT is not used to unnecessarily eliminate parities of terminal rows; and
(b) transposing and reducing again to upper triangle without disturbing the zeros in the now lower triangle, wherein the template or recursive procedures are not used, information about the errant rows is obtained from Steiner trees already constructed, and correction procedures are used to correct these rows.

12. A system comprising a processor and memory, the memory comprising computer executable instructions that when executed by the processor cause the system to partition gates of input circuits based on the locality of H gates in the circuits by:
partitioning gates of an input circuit according to positions of H gates in the input circuit to obtain a plurality of partitioned circuits;
generating a phase polynomial of each of the partitioned circuits; and
reconstructing an output circuit from the partitioned circuits for which phase Polynomials have been generated, while maintaining connectivity constraints.

13. The system of claim 12, wherein a linear transformation is determined for each of the partitioned circuits.

14. The system of claim 13, further comprising instructions for determining that an overall linear transformation of the output circuit maps to a final output.

15. System of claim 12, further comprising instructions for applying a series of transformations such that each parity term occurs at least once in the output circuit.

16. The system of claim 15, wherein the series of transformations comprise CNOT gates.

17. The system of claim 12, further comprising instructions for imposing connectivity constraints by constructing Steiner trees with terminals being a set of qubits or vertices satisfying certain conditions.

18. The system of claim 12, further comprising instructions for determining edge information and performing a series of CNOT operations to get a desired result according to the edge information.

19. The system of claim 12, wherein a set of gates that is partitioned corresponds to the phase polynomial of the entire circuit.

20. The system of claim 19, wherein between two H gates a phase polynomial network circuit is synthesized using gates in the circuit that realize a partial phase polynomial, including terms in the polynomial network that become incomputable after the H gate being placed at an end of the current slice.

21. The system of claim 12, comprising instructions for synthesizing CNOT+Rz circuits using Steiner trees by:
computing a Steiner tree according to Steiner rows and terminal rows;
for each root to leaf path, flipping the role of the root and leaf, such that parity gets accumulated at the root; and
adding up the parities to obtain a desired parity, wherein a matrix is changed according to the unflipped leaf and root to reflect changes due to position of CNOT gates.

22. The system of claim 12, comprising instructions for, while synthesizing CNOT+X circuits:
(a) reducing to upper triangle, wherein at least one CNOT is not used to unnecessarily eliminate parities of terminal rows; and
(b) transposing and reducing again to upper triangle without disturbing the zeros in the now lower triangle, wherein the template or recursive procedures are not used, information about the errant rows is obtained from Steiner trees already constructed, and correction procedures are used to correct these rows.

23. A non-transitory computer readable medium comprising computer executable instructions for partitioning gates of input circuits based on the locality of H gates in the circuits, comprising instructions for:
partitioning gates of an input circuit according to positions of H gates in the input circuit to obtain a plurality of partitioned circuits;
generating a phase polynomial of each of the partitioned circuits; and
reconstructing an output circuit from the partitioned circuits for which phase Polynomials have been generated, while maintaining connectivity constraints.

* * * * *